(12) United States Patent
Amano et al.

(10) Patent No.: US 6,909,813 B2
(45) Date of Patent: Jun. 21, 2005

(54) CONTOUR CORRECTING CIRCUIT AND CONTOUR CORRECTING METHOD

(75) Inventors: Ryuhei Amano, Hirataka (JP); Akihiro Maenaka, Kadoma (JP); Takeshi Hachiya, Kasai (JP); Haruhiko Murata, Ibaraki (JP)

(73) Assignee: Sanyo Electric Co., Ltd., Osaka (JP)

( * ) Notice: Subject to any disclaimer, the term of this patent is extended or adjusted under 35 U.S.C. 154(b) by 582 days.

(21) Appl. No.: 10/150,976

(22) Filed: May 21, 2002

(65) Prior Publication Data

US 2002/0191859 A1 Dec. 19, 2002

(30) Foreign Application Priority Data

May 22, 2001 (JP) .................................... 2001-152571

(51) Int. Cl.[7] ................................................ G06K 9/40
(52) U.S. Cl. ...................... 382/266; 382/269; 382/274; 382/275; 358/3.26; 358/3.27; 358/463
(58) Field of Search ................................ 382/252, 260, 382/263, 266, 269, 274, 275; 358/3.26, 3.27, 448, 463

(56) References Cited

U.S. PATENT DOCUMENTS

| | | | | |
|---|---|---|---|---|
| 4,633,296 A | * | 12/1986 | Cham et al. | ........... 375/240.18 |
| 5,471,535 A | * | 11/1995 | Ikezawa et al. | .............. 382/199 |
| 5,937,101 A | * | 8/1999 | Jeon et al. | ................... 382/268 |
| 6,285,798 B1 | * | 9/2001 | Lee | ............................. 382/260 |
| 6,453,076 B1 | * | 9/2002 | Nakajima | .................... 382/266 |

* cited by examiner

Primary Examiner—Yon J. Couso
Assistant Examiner—Yosef Kassa
(74) Attorney, Agent, or Firm—McDermott Will & Emery LLP

(57) ABSTRACT

In a contour correcting circuit that generates, on the basis of respective signals for a plurality of pixels including the pixel to be corrected at the center and arranged in a particular direction, a contour correction signal for the pixel to be corrected, there are provided contour component production means for producing a contour component for the pixel to be corrected depending on the gradient of the change among the respective signals for the plurality of pixels arranged in the particular direction; gain calculation means for calculating, on the basis of the level difference between the signal for the pixel to be corrected and the signal for the pixel adjacent in the particular direction to the pixel to be corrected, such a gain for correction that the larger the level difference is, the smaller the gain becomes; multiplication means for multiplying the contour component produced by the contour component production means by the gain for correction calculated by the gain calculation means; and addition means for adding the results of the multiplication by the multiplication means to the signal for the pixel to be corrected, to generate the contour correction signal for the pixel to be corrected.

16 Claims, 20 Drawing Sheets

FIG. 5

| C[-1] | C[+1] | C[-2] | C[-3] | C[-4] | C[+2] | C[+3] | C[+4] | MINIMUM VALUE | MAXIMUM VALUE | STARTING POINT | END POINT |
|---|---|---|---|---|---|---|---|---|---|---|---|
| POSITIVE | POSITIVE | POSITIVE | POSITIVE | POSITIVE | POSITIVE | POSITIVE | POSITIVE | S[-4] | S[+4] | S[-4] | S[+4] |
| | | | | | POSITIVE | POSITIVE | NEGATIVE/0 | | S[+3] | S[-3] | S[+3] |
| | | | | | POSITIVE | NEGATIVE/0 | X | | S[+2] | S[-2] | S[+2] |
| | | | | | NEGATIVE/0 | X | X | | S[+1] | S[-1] | S[+1] |
| | | | | NEGATIVE/0 | POSITIVE | POSITIVE | POSITIVE | S[-3] | S[+4] | S[-3] | S[+3] |
| | | | | | POSITIVE | POSITIVE | NEGATIVE/0 | | S[+3] | S[-3] | S[+3] |
| | | | | | POSITIVE | NEGATIVE/0 | X | | S[+2] | S[-2] | S[+2] |
| | | | | | NEGATIVE/0 | X | X | | S[+1] | S[-1] | S[+1] |
| | | | NEGATIVE/0 | X | POSITIVE | POSITIVE | POSITIVE | S[-2] | S[+4] | S[-2] | S[+2] |
| | | | | | POSITIVE | POSITIVE | NEGATIVE/0 | | S[+3] | S[-2] | S[+2] |
| | | | | | POSITIVE | NEGATIVE/0 | X | | S[+2] | S[-2] | S[+2] |
| | | | | | NEGATIVE/0 | X | X | | S[+1] | S[-1] | S[+1] |
| | | NEGATIVE/0 | X | X | POSITIVE | POSITIVE | POSITIVE | S[-1] | S[+4] | S[-1] | S[+1] |
| | | | | | POSITIVE | POSITIVE | NEGATIVE/0 | | S[+3] | S[-1] | S[+1] |
| | | | | | POSITIVE | NEGATIVE/0 | X | | S[+2] | S[-1] | S[+1] |
| | | | | | NEGATIVE/0 | X | X | | S[+1] | S[-1] | S[+1] |
| NEGATIVE | NEGATIVE | NEGATIVE | NEGATIVE | NEGATIVE | NEGATIVE | NEGATIVE | NEGATIVE | S[+4] | S[-4] | S[-4] | S[+4] |
| | | | | | NEGATIVE | NEGATIVE | POSITIVE/0 | S[+3] | | S[-3] | S[+3] |
| | | | | | NEGATIVE | POSITIVE/0 | X | S[+2] | | S[-2] | S[+2] |
| | | | | | POSITIVE/0 | X | X | S[+1] | | S[-1] | S[+1] |
| | | | | POSITIVE/0 | NEGATIVE | NEGATIVE | NEGATIVE | S[+4] | S[-3] | S[-3] | S[+3] |
| | | | | | NEGATIVE | NEGATIVE | POSITIVE/0 | S[+3] | | S[-3] | S[+3] |
| | | | | | NEGATIVE | POSITIVE/0 | X | S[+2] | | S[-2] | S[+2] |
| | | | | | POSITIVE/0 | X | X | S[+1] | | S[-1] | S[+1] |
| | | | POSITIVE/0 | X | NEGATIVE | NEGATIVE | NEGATIVE | S[+4] | S[-2] | S[-2] | S[+2] |
| | | | | | NEGATIVE | NEGATIVE | POSITIVE/0 | S[+3] | | S[-2] | S[+2] |
| | | | | | NEGATIVE | POSITIVE/0 | X | S[+2] | | S[-2] | S[+2] |
| | | | | | POSITIVE/0 | X | X | S[+1] | | S[-1] | S[+1] |
| | | POSITIVE/0 | X | X | NEGATIVE | NEGATIVE | NEGATIVE | S[+4] | S[-1] | S[-1] | S[+1] |
| | | | | | NEGATIVE | NEGATIVE | POSITIVE/0 | S[+3] | | S[-1] | S[+1] |
| | | | | | NEGATIVE | POSITIVE/0 | X | S[+2] | | S[-1] | S[+1] |
| | | | | | POSITIVE/0 | X | X | S[+1] | | S[-1] | S[+1] |
| OTHERS | | | | | | | | S[0] | S[0] | S[0] | S[0] |

FIG. 18

CONTOUR CORRECTING CIRCUIT AND CONTOUR CORRECTING METHOD

BACKGROUND OF THE INVENTION

1. Field of the Invention

The present invention relates to a contour correcting circuit and a contour correcting method.

2. Description of the Prior Art

In order that a reproduced image is a clear image having a good contrast, Laplacian processing for adding Laplacian which is a secondary space differential to image data related to each of pixels for outputting image data to be its contour in order to make the contour of a subject clear to enhance an edge of the image has been conventionally performed.

In such a conventional contour correcting method, an oblique jaggy, a preshoot, an overshoot, or a sticky feeling is created, and only a particular frequency component is enhanced. Accordingly, an unnatural image whose contour has been enhanced is obtained.

SUMMARY OF THE INVENTION

An object of the present invention is to provide a contour correcting circuit and a contour correcting method in which a natural image whose contour has been enhanced is obtained.

In a contour correcting circuit that generates, on the basis of respective signals for a plurality of pixels including the pixel to be corrected at the center and arranged in a particular direction, a contour correction signal for the pixel to be corrected, a contour correcting circuit according to the present invention is characterized by comprising contour component production means for producing a contour component for the pixel to be corrected depending on the gradient of the change among the respective signals for the plurality of pixels arranged in the particular direction; gain calculation means for calculating, on the basis of the level difference between the signal for the pixel to be corrected and the signal for the pixel adjacent in the particular direction to the pixel to be corrected, such a gain for correction that the larger the level difference is, the smaller the gain becomes; multiplication means for multiplying the contour component produced by the contour component production means by the gain for correction calculated by the gain calculation means; and addition means for adding the results of the multiplication by the multiplication means to the signal for the pixel to be corrected, to generate the contour correction signal for the pixel to be corrected.

There may be provided offset contour correction pixel production means for weighting and adding the contour correction signal for the pixel to be corrected and a contour correction signal for the pixel adjacent to the pixel to be corrected, to produce one or a plurality of offset contour correction pixels between the pixel to be corrected and the adjacent pixel.

There may be provided minimum and maximum values calculation means for calculating the minimum value and the maximum value of a portion having a gradient which is not less than a predetermined gradient depending on the gradient of the change among the respective signals for the plurality of pixels arranged in the particular direction, and clipping means for comparing the contour correction signal with the minimum value and the maximum value which are calculated by the minimum and maximum values calculation means, to correct, when the contour correction signal is smaller than the minimum value, the contour correction signal to the minimum value, while correcting, when the contour correction signal is larger than the maximum value, the contour correction signal to the maximum value.

There may be provided means for weighting and adding the contour correction signal for the pixel to be corrected and the contour correction signal for the pixel adjacent to the pixel to be corrected, to produce one or a plurality of offset contour correction pixels between the pixel to be corrected and the adjacent pixel.

An example of the contour component production means is one comprising selection means for selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and means for producing a contour component for the pixel to be corrected on the basis of the respective signals for the gradient starting point pixel and the gradient end point pixel which are selected by the selection means and the signal for the pixel to be corrected.

In a contour correcting method for generating, on the basis of respective signals for a plurality of pixels including the pixel to be corrected at the center and arranged in a particular direction, a contour correction signal for the pixel to be corrected, a contour correcting method according to the present invention is characterized by comprising a first step of producing a contour component for the pixel to be corrected depending on the gradient of the change among the respective signals for the plurality of pixels arranged in the particular direction; a second step of calculating, on the basis of the level difference between the signal for the pixel to be corrected and the signal for the pixel adjacent in the particular direction to the pixel to be corrected, such a gain for correction that the larger the level difference is, the smaller the gain becomes; a third step of multiplying the contour component produced at the first step by the gain for correction calculated at the second step; and a fourth step of adding the results of the multiplication at the third step to the signal for the pixel to be corrected, to generate the contour correction signal for the pixel to be corrected.

There may be provided a fifth step of weighting and adding the contour correction signal for the pixel to be corrected and a contour correction signal for the pixel adjacent to the pixel to be corrected, to produce one or a plurality of offset contour correction pixels between the pixel to be corrected and the adjacent pixel.

There may be provided a sixth step of calculating the minimum value and the maximum value of a portion having a gradient which is not less than a predetermined gradient depending on the gradient of the change among the respective signals for the plurality of pixels arranged in the particular direction, and a seventh step of comparing the contour correction signal with the minimum value and the maximum value calculated at the sixth step, to correct, when the contour correction signal is smaller than the minimum value, the contour correction signal to the minimum value, while correcting, when the contour correction signal is larger than the maximum value, the contour correction signal to the maximum value.

An example of the first step is one comprising an eighth step of selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and a ninth step of producing a contour component for the pixel to be corrected on the basis of the respective signals for the gradient starting point pixel and the gradient end point pixel which are selected at the eighth step and the signal for the pixel to be corrected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a schematic view showing an example of a table used in a minimum and maximum values/gradient starting and end points selecting unit 22c;

FIG. 18 is a schematic view showing an example of a table used in a minimum and maximum values/gradient starting and end points selecting unit 132c;

DESCRIPTION OF THE PREFERRED EMBODIMENTS

Figure 1:
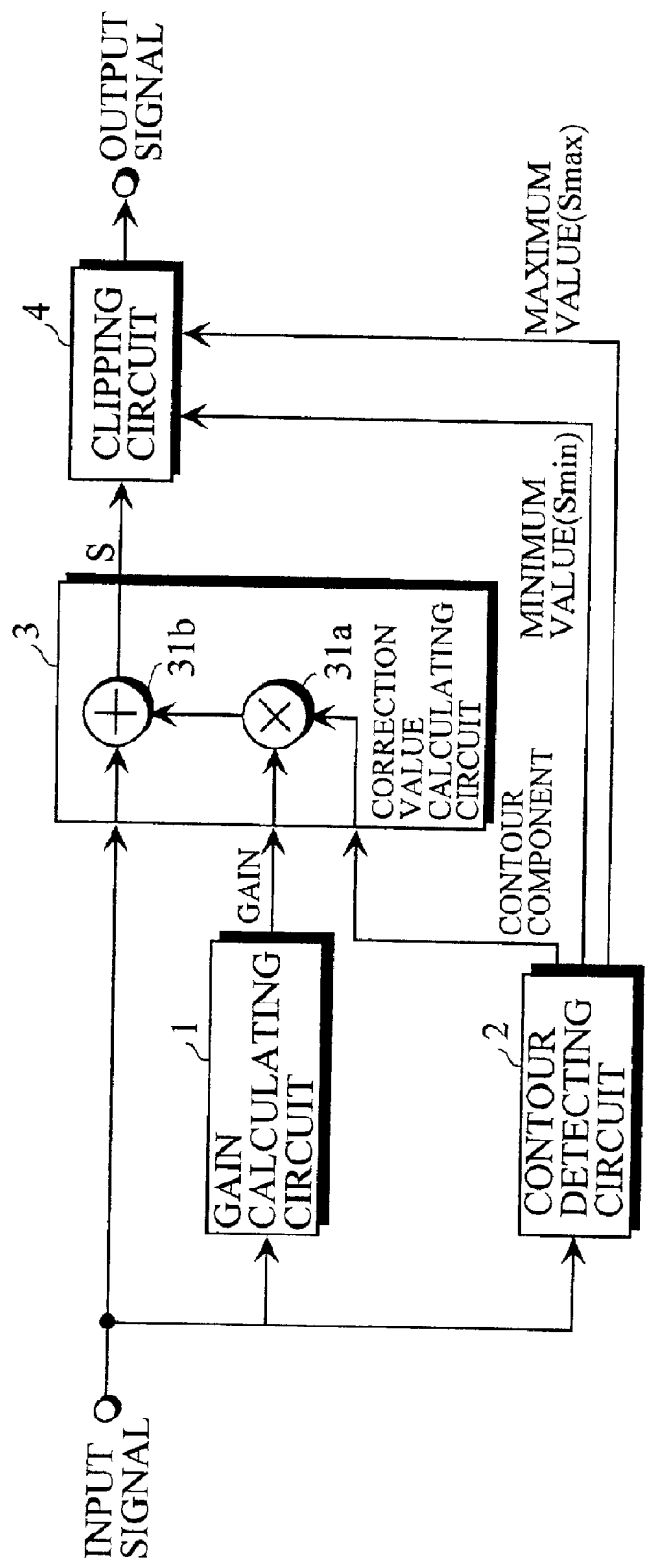
FIG. 1 is a block diagram showing the overall configuration of a contour correcting circuit according to a first embodiment of the present invention.

Referring now to the drawings, embodiments of the present invention will be described.

[A] Description of First Embodiment

[1] Description of Overall Configuration of Contour Correcting Circuit

FIG. 1 illustrates the overall configuration of a contour correcting circuit.

The contour correcting circuit comprises a gain calculating circuit 1, a contour detecting circuit 2, a correction value calculating circuit 3, and a clipping circuit 4.

The gain calculating circuit 1 generates a gain for correction depending on the level of the change between an input signal and a vicinity signal.

The contour detecting circuit 2 calculates a contour component, a maximum value for clipping, and a minimum value for clipping in a particular number of taps or the number of taps corresponding to a gradient.

The correction value calculating circuit 3 adds a value obtained by adjusting the contour component using the gain for correction to the input signal.

The clipping circuit 4 corrects, when a signal obtained by the correction value calculating circuit 3 is not more than the minimum value for clipping, the signal to the minimum value for clipping, while correcting, when the signal obtained by the correction value calculating circuit 3 is not less than the maximum value for clipping, the signal to the maximum value for clipping in order to prevent the creation of a preshoot and an overshoot.

Although the contour correcting circuit can be used as a horizontal contour correcting circuit or a vertical contour correcting circuit, description is made, taking as an example a case where the contour correcting circuit is used as a horizontal contour correcting circuit in the following description.

[2] Description of Gain Calculating Circuit 1

Figure 2:
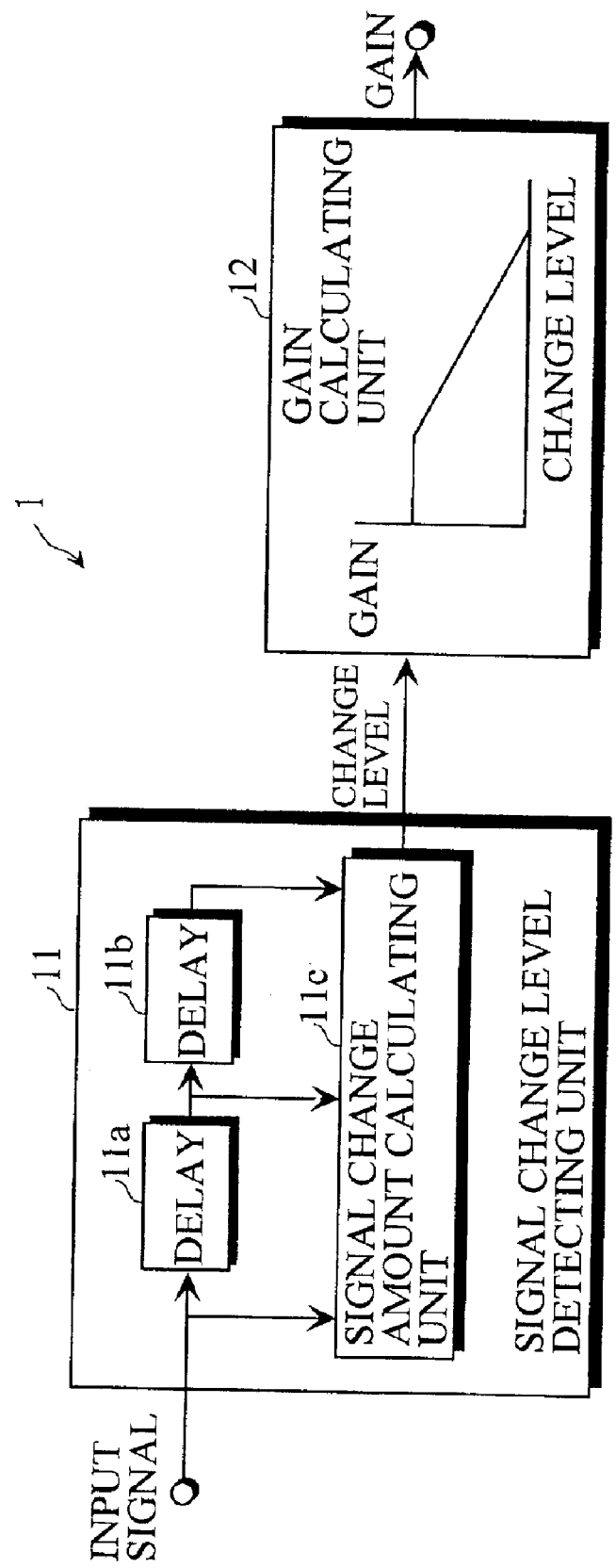
FIG. 2 is a block diagram showing the configuration of a gain calculating circuit 1.

FIG. 2 illustrates the configuration of the gain calculating circuit 1.

The gain calculating circuit 1 comprises a signal change level detecting unit 11 for calculating the level of a signal change between respective signals for a pixel to be corrected and an adjacent pixel ahead of or behind the pixel to be corrected and a gain calculating unit 12 for outputting a gain corresponding to the signal change level detected by the signal change level detecting unit 11.

The signal change level detecting unit 11 comprises a first delay circuit 11a, a second delay circuit 11b, and a signal change amount calculating unit 11c. Each of the delay circuits 11a and 11b delays an input signal by one pixel and outputs the delayed input signal.

The input signal is fed to the signal change amount calculating unit 11c and is fed to the first delay circuit 11a. The signal, which has been delayed by one pixel by the first delay circuit 11a, is fed to the signal change amount calculating unit 11c and is fed to the second delay circuit 11b. The signal, which has been delayed by one pixel by the second delay circuit 11b, is fed to the signal change amount calculating unit 11c.

The input signal shall be represented by a string of signals for pixels d1, d2, d3, . . . . When the input signal is the signal for the pixel d3, the respective signals for the pixels d1, d2, and d3 are inputted to the signal change amount calculating unit 11c. The pixel to be corrected is d2.

The signal change amount calculating unit 11c respectively calculates level differences |d2−d1| and |d2−d3| between the signal for the pixel to be corrected d2 and the respective signals for the adjacent pixels d1 and d3. The larger level difference is outputted as a signal change level.

The gain calculating unit 12 outputs a gain corresponding to the signal change level detected by the signal change level detecting unit 11 on the basis of a relationship with a gain corresponding to a change level previously produced, as shown in FIG. 2. In principal, the higher the change level becomes, the smaller the gain becomes.

[3] Description of Contour Detecting Circuit 2

Figure 3:
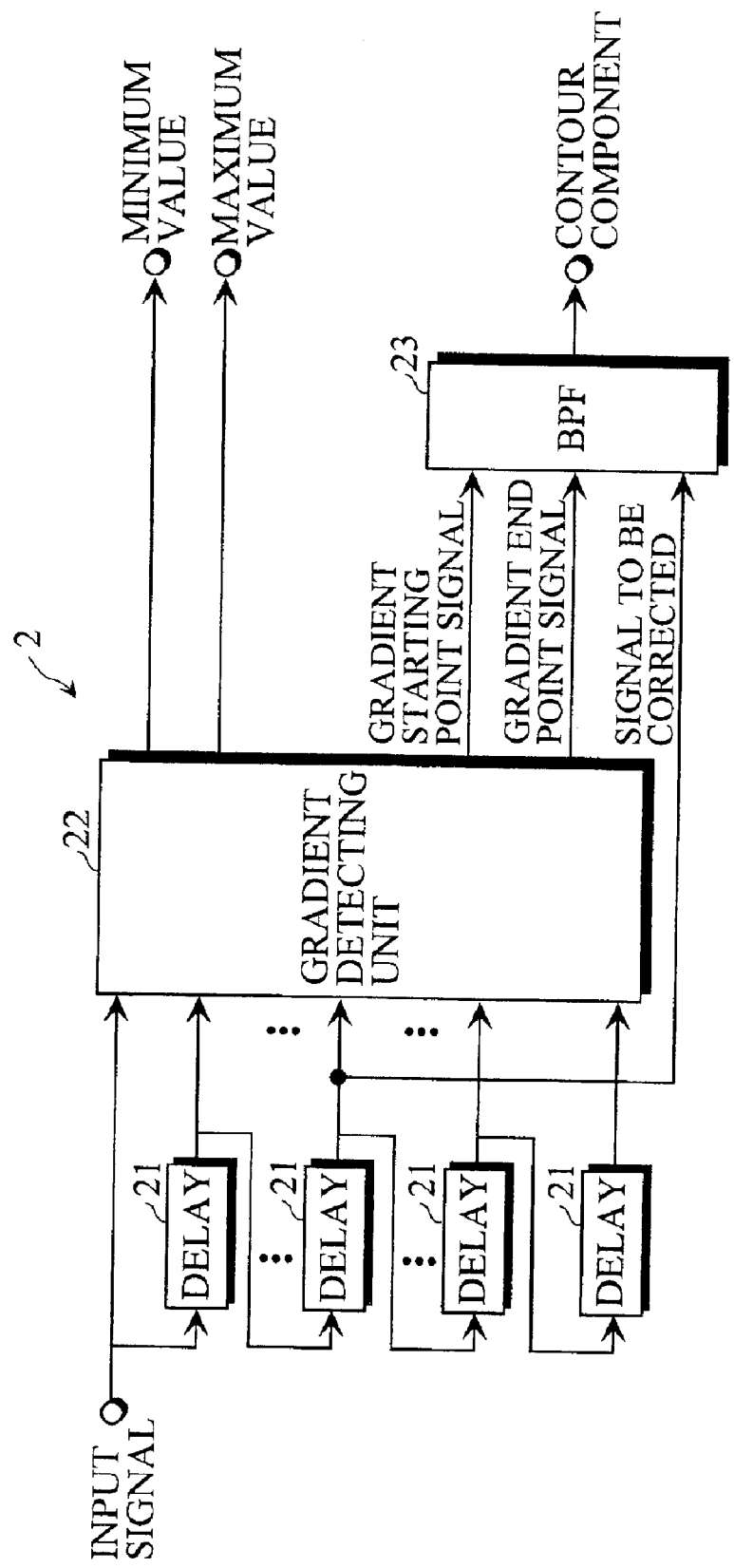
FIG. 3 is a block diagram showing the configuration of a contour detecting circuit 2.

FIG. 3 illustrates the configuration of the contour detecting circuit 2.

The contour detecting circuit 2 comprises a plurality of delay circuits 21, a gradient detecting unit 22, and a BPF (Band-Pass Filter) 23. Each of the delay circuits 21 delays an input video signal by one pixel and outputs the delayed video signal.

The input signal and an output signal of each of the delay circuits 21 are inputted to the gradient detecting unit 22. That is, a video signal for a pixel to be corrected and respective video signals for a plurality of pixels ahead of and behind the pixel to be corrected are inputted to the gradient detecting unit 22. The gradient detecting unit 22 outputs a maximum value for clipping, a minimum value for clipping, and a signal for contour component calculation depending on the gradient of the signal inputted thereto. The signal for contour component calculation is composed of a gradient starting point signal and a gradient end point signal. The signal for contour component calculation is fed to the BPF 23.

The BPF 23 produces a contour component from the signal for the pixel to be corrected and the signal for contour component calculation. The contour component is calculated on the basis of the following equation (1), for example:

Contour component=2×signal for pixel to be corrected−(gradient starting point signal+gradient end point signal)  (1)

Figure 4:
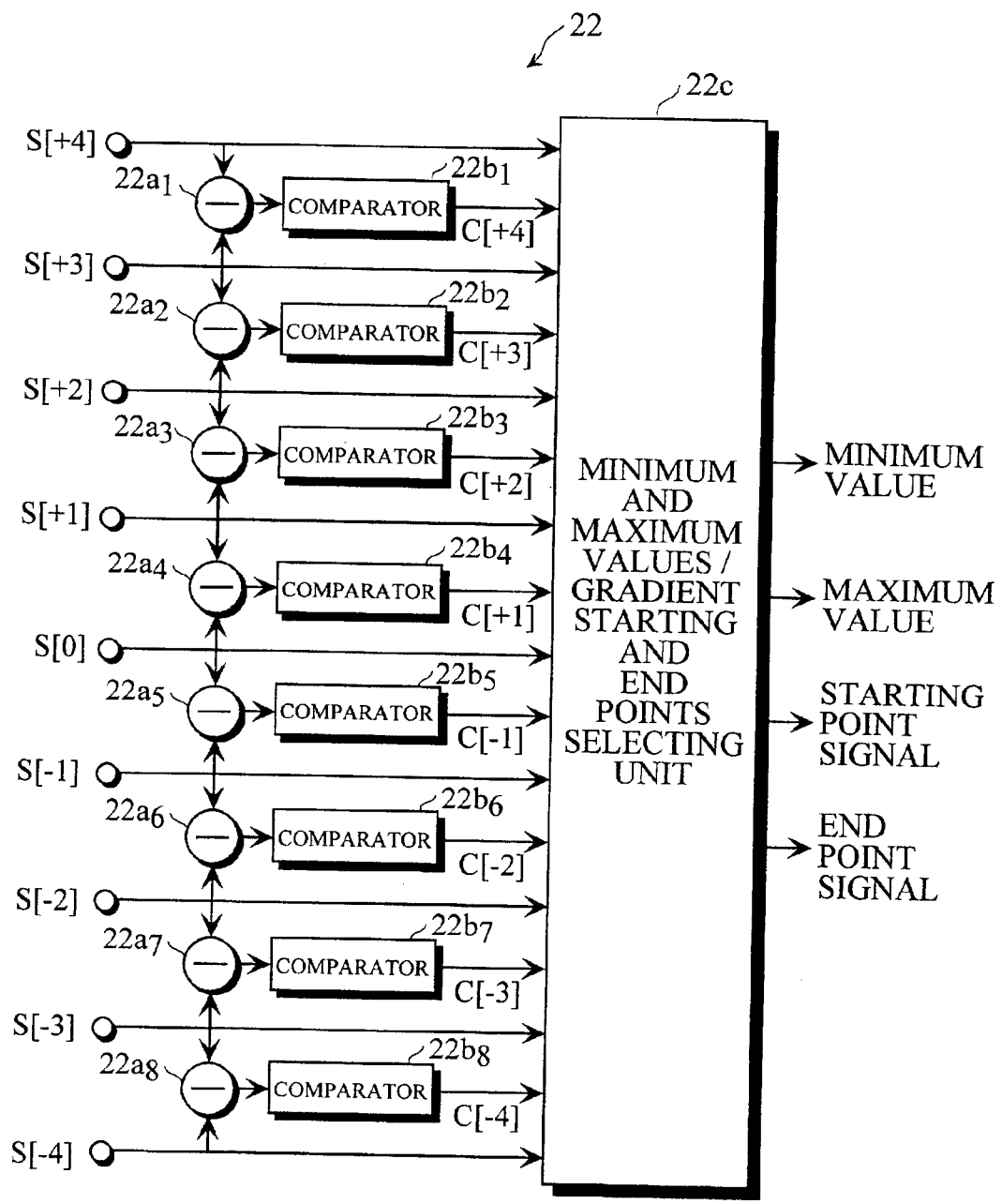
FIG. 4 is a block diagram showing the detailed configuration of a gradient detecting unit 22.

FIG. 4 illustrates the detailed configuration of the gradient detecting unit 22.

Figure 6:
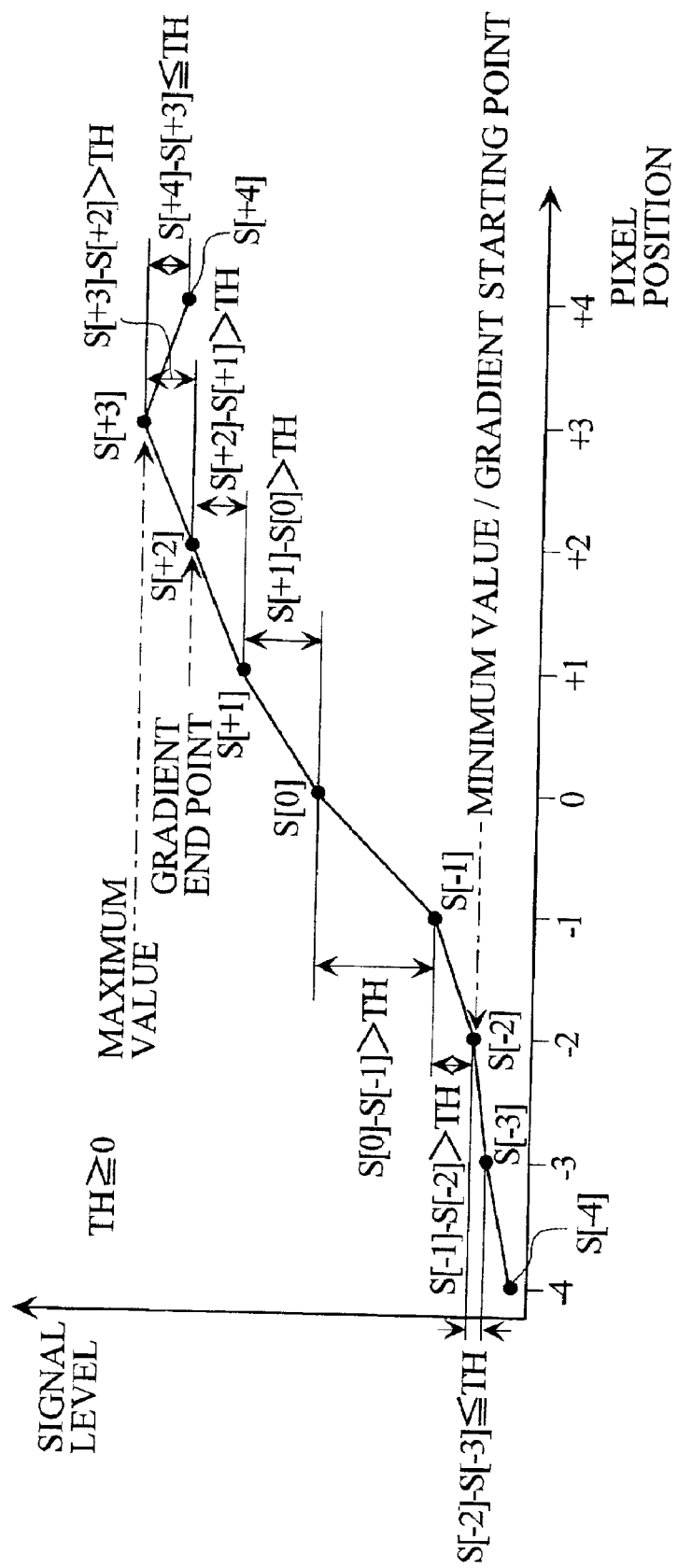
FIG. 6 is an explanatory view for explaining the basic idea of a method of detecting a gradient by a gradient detecting unit 22.

In this example, respective signals for continuous nine pixels shall be inputted to the gradient detecting unit 22, as shown in FIG. 6. The signal for the pixel to be corrected is represented by S[0], and the respective signals for the plurality of pixels ahead of and behind the pixel to be corrected are represented by S[−4] to S[−1] and S[+1] to S[+4].

The gradient detecting unit 22 comprises eight subtracters $22a_1$ to $22a_8$ for respectively calculating the differences among the respective signals for the adjacent pixels, eight comparators $22b_1$ to $22b_8$ provided for the respective subtracters $22a_1$ to $22a_8$ for comparing the results of the subtraction by the corresponding subtracters with two threshold values +TH and −TH, to detect the direction of the gradient, and a minimum and maximum values/gradient starting and end points selecting unit 22c for producing a maximum value for clipping, a minimum value for clipping, a gradient starting point signal, and a gradient end point signal on the basis of the results of the comparison by each of the comparators $22b_1$ to $22b_8$.

The maximum value for clipping means the maximum value of a portion having a gradient (a gradient portion) including the pixel to be corrected, which is S[+3] in the example shown in FIG. 6. The minimum value for clipping means the minimum value of the gradient portion, which is S[−2] in the example shown in FIG. 6. It is judged whether or not there is a gradient depending on whether or not the difference between the respective signals for the adjacent pixels is not less than the threshold value TH. That is, it is judged that there is a gradient if the difference between the respective signals for the adjacent pixels is not less than the threshold value TH. In the example shown in FIG. 6, the starting point of the gradient portion is S[−2], and the end point of the gradient point is S[+3].

In the specification, the number of taps is for determining BPF frequency characteristics for extracting a contour component. The smaller the number of taps is, the higher a frequency component to be extracted is.

The range of the number of taps is determined as a range of symmetry, centered at the pixel to be corrected S[0]. When the pixel to be corrected S[0] is close to the maximum value for clipping out of the maximum value for clipping and the minimum value for clipping, therefore, the number of taps is found on the basis of the distance between the pixel to be corrected S[0] and the pixel taking the maximum value. When the pixel to be corrected S[0] is close to the minimum value for clipping out of the maximum value for clipping and the minimum value for clipping, the number of taps is found on the basis of the distance between the pixel to be corrected S[0] and the pixel taking the minimum value. In the example shown in FIG. 6, the range of the number of taps is from the minimum value S[−2] to S[+2], and the number of taps is five.

The gradient starting point signal means a signal at the starting point of the gradient portion in the range of the number of taps, which is S[−2] in the example shown in FIG. 6. The gradient end point signal means a signal at the end point of the gradient portion in the range of the number of taps, which is S[+2] in the example shown in FIG. 6.

The subtracters $22a_1$ to $22a_8$ perform the following subtraction:
Subtracter $22a_1$: S[+4]−S[+3]
Subtracter $22a_2$: S[+3]−S[+2]
Subtracter $22a_3$: S[+2]−S[+1]
Subtracter $22a_4$: S[+1]−S[0]
Subtracter $22a_5$: S[0]−S[−1]
Subtracter $22a_6$: S[−1]−S[−2]
Subtracter $22a_7$: S[−2]−S[−3]
Subtracter $22a_8$: S[−3]−S[−4]

The respective comparators $22b_1$ to $22b_8$ make the following judgment on the input value IN, and respectively output the results of the judgment C[+4] to C[−4].

If IN>+TH then direction of gradient=positive (gradient+: upward to the right)

If IN<−TH then direction of gradient=negative (gradient−: downward to the right)

If −TH≦IN≦+TH then direction of gradient=0 (no gradient)

The minimum and maximum values/gradient starting and end points selecting unit 22c produces a maximum value for clipping, a minimum value for clipping, a gradient starting point signal, and a gradient end point signal by a table as shown in FIG. 5 or a logical circuit having the table as shown in FIG. 5 as a truth table.

Description is made of the basic idea of a method of detecting a gradient by the gradient detecting unit 22 using FIG. 6.

If S[+1]−S[0]>TH and S[0]−S[−1]>TH, it is judged that the gradient is positive. If S[+1]−S[0]<−TH and S[0]−S[−1]<−TH, it is judged that the gradient is negative. In the other case, it is judged that there is no gradient. When it is judged that there is no gradient, the maximum value for clipping, the minimum value for clipping, the gradient starting point signal, and the gradient end point signal are S[0].

Description is made of the case shown in FIG. 6.

(1) Since S[+1]−S[0]>TH and S[0]−S[−1]>TH, it is judged that the gradient is positive.

(2) S[+2]−S[+1]>TH
(3) S[+3]−S[+2]>TH
(4) S[+4]−S[+3]≦TH

Consequently, the maximum value (the maximum value of the gradient portion) is determined to be S[+3]. Since the maximum value is S[+3], the temporary number of taps A is determined to be seven (=3×2+1). The temporary number of taps means the number of taps based on the distance between the pixel to be corrected and the pixel taking the maximum value and the number of taps based on the distance between the pixel to be corrected and the pixel taking the minimum value, which numbers of taps are separately calculated. Finally, the smaller one of both the numbers of taps is selected as the number of taps.

(5) S[0]−S[−1]>TH
(6) S[−1]−S[−2]>TH
(7) S[−2]−S[−3]≦TH

Consequently, the minimum value (the minimum value of the gradient portion) is determined to be S[−2]. Since the minimum value is S[−2], the temporary number of taps B is determined to be five (=2×2+1).

(8) The smaller one of the temporary numbers of taps A and B, i.e., five is selected as the number of taps. A starting point of the continuous five pixels, centered at the pixel to be corrected, is determined as a gradient starting point, and an end point thereof is determined as a gradient end point. Consequently, the gradient starting point signal is S [−2], and the gradient end point signal is S[+2].

[4] Description of Correction Value Calculating Circuit 3

The correction value calculating circuit 3 comprises a multiplier 31a and an adder 31b, as shown in FIG. 1. In FIG. 1, delay means for matching the respective timings of signals inputted to the correction value calculating circuit 3 is omitted.

The multiplier 31a multiplies a contour component corresponding to a predetermined signal for the pixel to be corrected obtained by the contour detecting circuit 2 by a gain corresponding to the signal for the pixel to be corrected obtained by the gain calculating circuit 1. The adder 31b adds the results of the multiplication by the multiplier 31a (a value obtained by adjusting the contour component using the gain) to the above-mentioned signal for the pixel to be corrected (input signal), and outputs the results of the addition. The output of the adder 31b is fed to the clipping circuit 4.

[5] Description of Clipping Circuit 4

Figure 7:
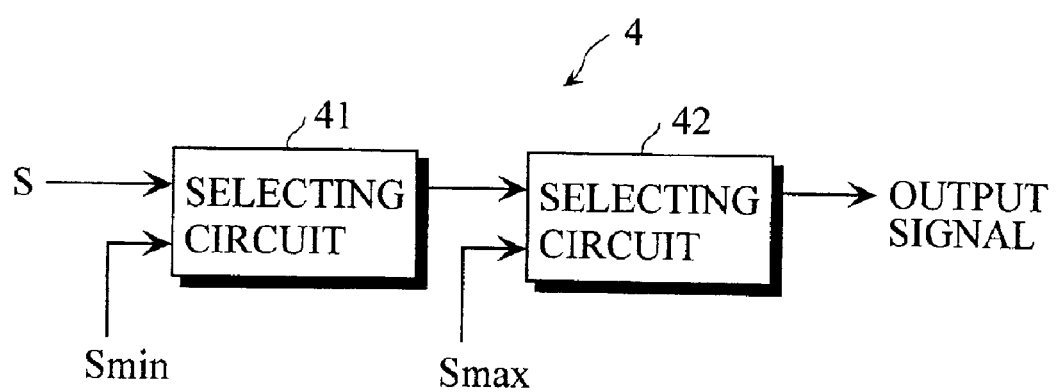
FIG. 7 is a block diagram showing the configuration of a clipping circuit 4.

FIG. 7 illustrates the configuration of the clipping circuit 4. In FIG. 7, delay means for matching the respective timings of signals inputted to the clipping circuit 4 is omitted.

The clipping circuit 4 comprises a first selecting circuit 41 and a second selecting circuit 42. A signal S obtained by the correction value calculating circuit 3 and a minimum value for clipping $S_{min}$ obtained by the contour detecting circuit 2 are inputted to the first selecting circuit 41. The two signals are signals for the same pixel to be corrected. The first selecting circuit 41 selects the larger signal MAX[S, $S_{min}$] out of the signal S obtained by the correction value calculating circuit 3 and the minimum value for clipping $S_{min}$, and outputs the selected signal.

The signal MAX[S, $S_{min}$] outputted from the first selecting circuit 41 and a maximum value for clipping $S_{max}$ obtained by the contour detecting circuit 2 are inputted to the second selecting circuit 42. The two signals are signals for the same pixel to be corrected. The second selecting circuit 42 selects the smaller signal MIN[MAX[S, $S_{min}$], $S_{max}$] out of the signal MAX[S, Smin] and the maximum value for clipping $S_{max}$, and outputs the selected signal.

If the magnitudes of the two signals respectively inputted in the selecting circuits 41 and 42 are the same, the signal S obtained by the correction value calculating circuit 3 is selected in the selecting circuit 41, and the signal MAX[S, $S_{min}$] obtained by the selecting circuit 41 is selected in the selecting circuit 42.

[6] Description of Advantages of Above Embodiment

[6-1] Description of Advantages by Providing Gain Calculating Circuit 1

In the above-mentioned embodiment, a gain by which a contour component is adjusted is made variable by the gain calculating circuit 1. That is, the larger a level difference between the signal for the pixel to be corrected and a signal for the pixel adjacent to the pixel to be corrected (a signal change level) becomes, the smaller the gain becomes. A case where the gain is thus made variable and a case where it is fixed are compared with each other.

Figure 8A:
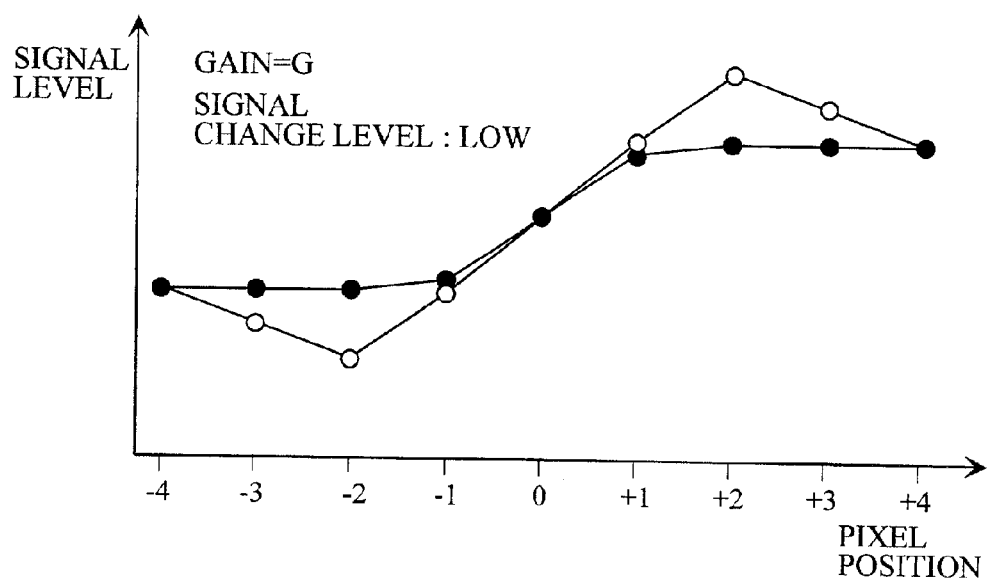
FIGS. 8a and 8b are timing charts showing an original signal (a black circle) and a contour correction signal (a white circle) in a case where a gain corresponding to a contour component is variable.
Figure 8B:
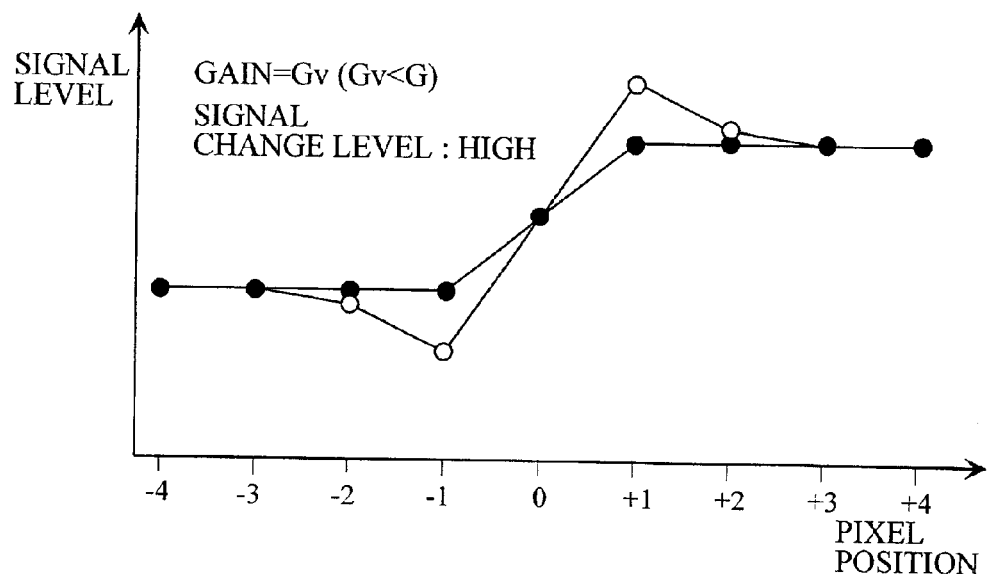
Figure 9A:
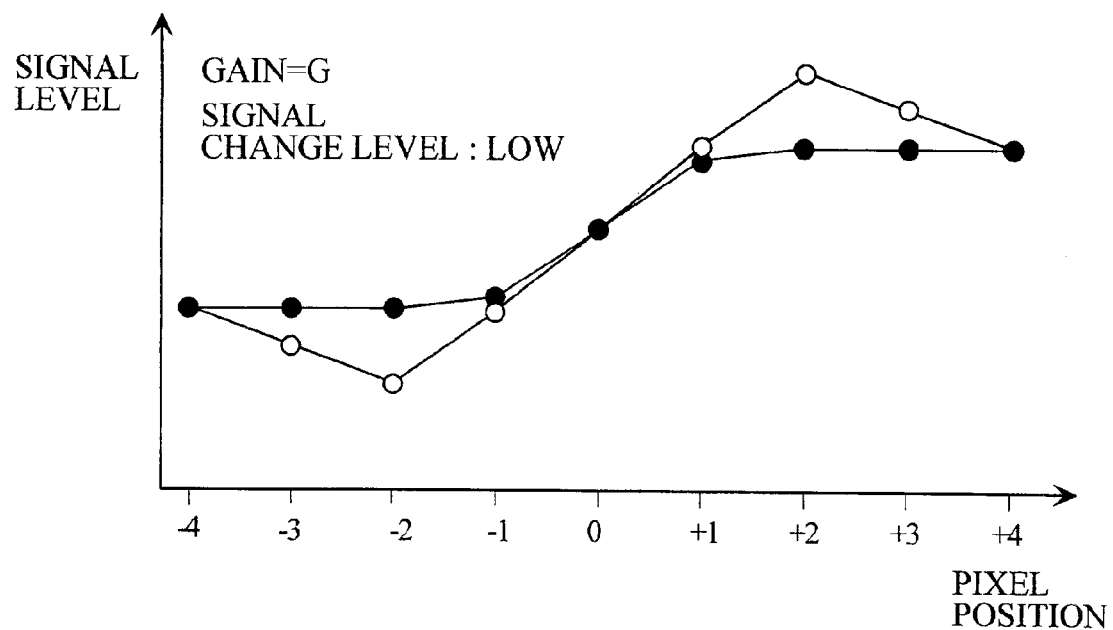
FIGS. 9a and 9b are timing charts showing an original signal (a black circle) and a contour correction signal (a white circle) in a case where a gain corresponding to a contour component is fixed.
Figure 9B:
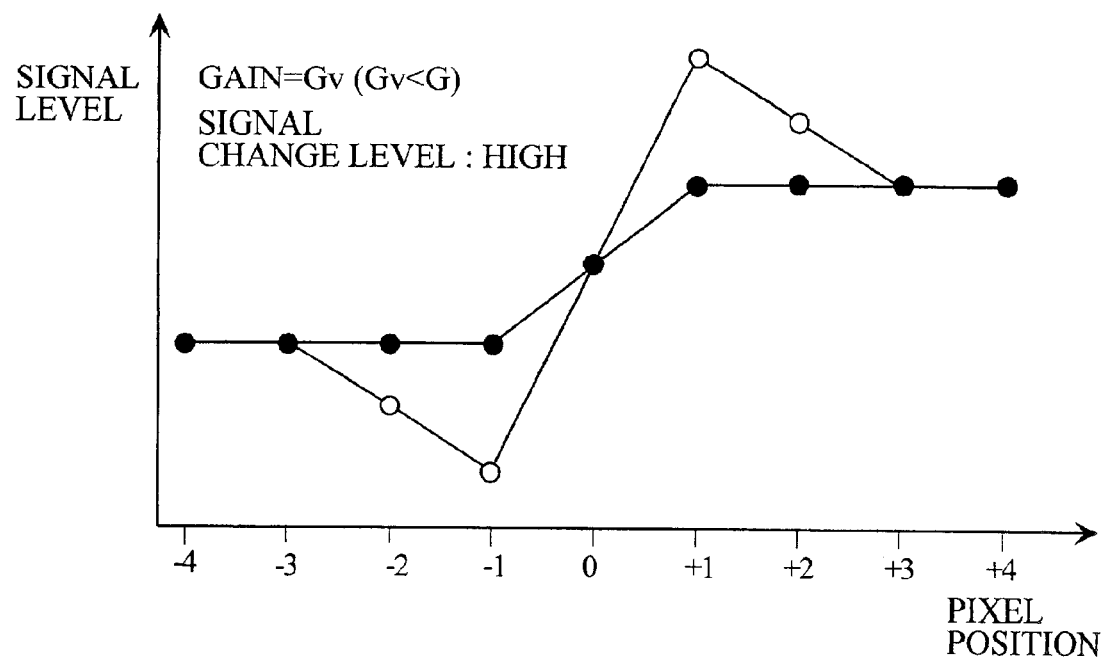

FIGS. 8a and 8b illustrate an original signal (a black circuit) and a contour correction signal (an output of the correction value calculating circuit 3 shown in FIG. 1; a white circle) in a case where the gain corresponding to the contour component is variable, and FIGS. 9a and 9b illustrate an original signal (a black circle) and a contour correction signal (a white circle) in a case where the gain corresponding to the contour component is fixed.

FIGS. 8a and 9a illustrate a case where the gradient of the signal is small, and FIGS. 8b and 9b illustrate a case where the gradient of the signal is large.

In a case where the gain corresponding to the contour component is fixed irrespective of the magnitude of the gradient of the signal, as shown in FIGS. 9a and 9b, when the gain is fixed to such a value that a sufficient contour enhancement effect is obtained even when the signal change level is low, a jagged feeling is enhanced in an oblique line or the like because a contour is too strongly enhanced when the signal change level is high.

In the present embodiment, the higher the signal change level becomes, the smaller the gain corresponding to the contour component is made. Even if the gradients of the signals differ, as shown in FIGS. 8a and 8b, a significant difference cannot be seen in the degree of correction. Therefore, no jagged feeling is created in the oblique line or the like, thereby making it possible to obtain a sufficient contour enhancement effect.

[6-2] Description of Advantage by Producing Contour Component Using Variable Taps In the present embodiment, the contour component is calculated by the signal for the pixel to be corrected, the gradient starting point signal, and the gradient end point signal, as shown in the foregoing equation (1). The distance (the number of taps) from the gradient starting point signal to the gradient end point signal differs depending on each portion of the gradient, as shown in the table shown in FIG. 5.

Figure 10:
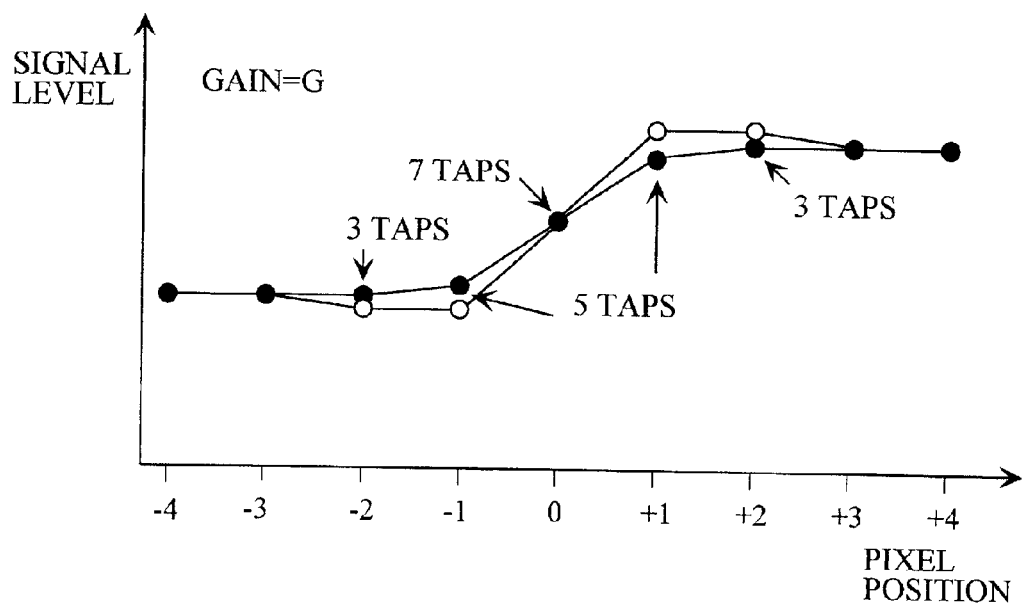
FIG. 10 is a timing chart showing an original signal (a black circle) and a contour correction signal (a white circle) in a case where a contour is enhanced by variable taps.
Figure 11:
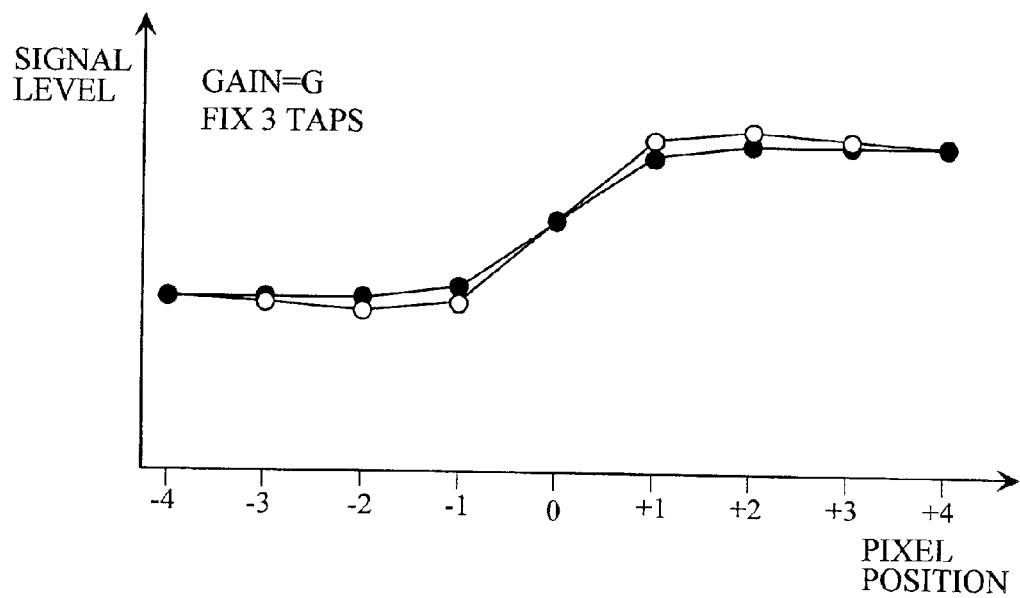
FIG. 11 is a timing chart showing an original signal (a black circle) and a contour correction signal (a white circle) in a case where a contour is enhanced by fixing three taps.

FIG. 10 illustrates an original signal (a black circle) and a contour correction signal (a white circle) in a case where a contour is enhanced by variable taps, and FIG. 11 illustrates an original signal (a black circle) and a contour correction signal (a white circle) in a case where a contour is enhanced by fixing three taps.

When the contour is enhanced by fixing three taps, as shown in FIG. 11, the degree of the contour enhancement is high in a rise portion and a fall portion of the gradient, while being low in the vicinity of the center of the gradient. Accordingly, the effect of improving signal transition characteristics is low.

In the present embodiment, the contour component is produced by three taps in the rise portion or the fall portion of the gradient, five taps between the center of the gradient and the rise portion or the fall portion of the gradient, and seven taps at the center of the gradient. Accordingly, the degree of the contour enhancement in the vicinity of the center of the gradient is particularly high, as shown in FIG. 10, so that the signal transition characteristics are improved.

[6-3] Description of Advantages by Providing Clipping Circuit 4

In the present embodiment, by the clipping circuit 4, a signal whose value is larger than the maximum value for clipping is corrected to the maximum value for clipping, and a signal whose value is smaller than the minimum value for clipping is corrected to the minimum value for clipping.

Figure 12:
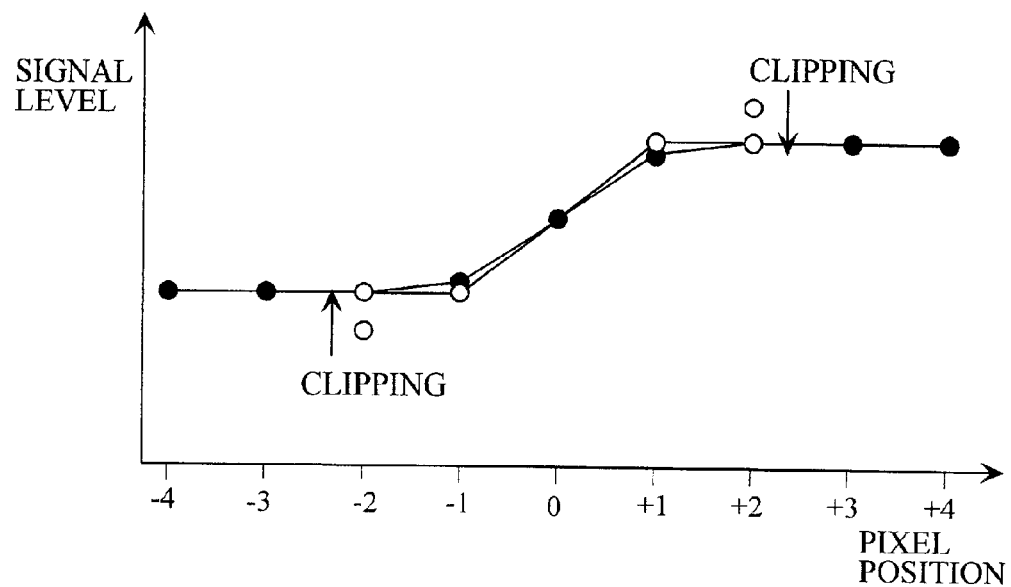
FIG. 12 is a timing chart showing an original signal (a black circle) and a contour correction signal (a white circle) in a case where a clipping circuit 4 is provided.
Figure 13:
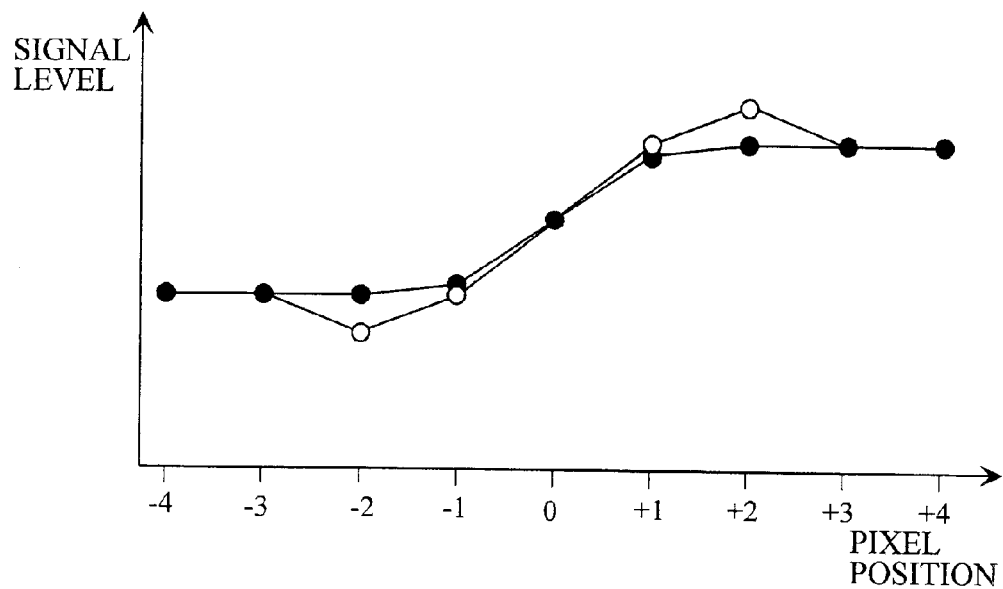
FIG. 13 is a timing chart showing an original signal (a black circle) and a contour correction signal (an output of a correction value calculating circuit; a white circle) in a case where no clipping circuit 4 is provided.

FIG. 12 illustrates an original signal (a black circle) and a contour correction signal (an output of the clipping circuit 4; a white circle) in a case where the clipping circuit 4 is provided, and FIG. 13 illustrates an original signal (a black circle) and a contour correction signal (an output of the correction value calculating circuit 3; a white circle) in a case where no clipping circuit 4 is provided.

As shown in FIG. 13, when no clipping circuit 4 is provided, a preshoot or an overshoot is created in a rise portion or a fall portion of the gradient of the contour correction signal. When the contour enhancement effect is increased, therefore, an unnatural image in which white lines, black lines, or the like occur on both sides of the contour is obtained.

In the present embodiment, the clipping circuit 4 is provided, a natural image, whose contour has been enhanced, in which no preshoot or overshoot is created is obtained.

Figure 14:
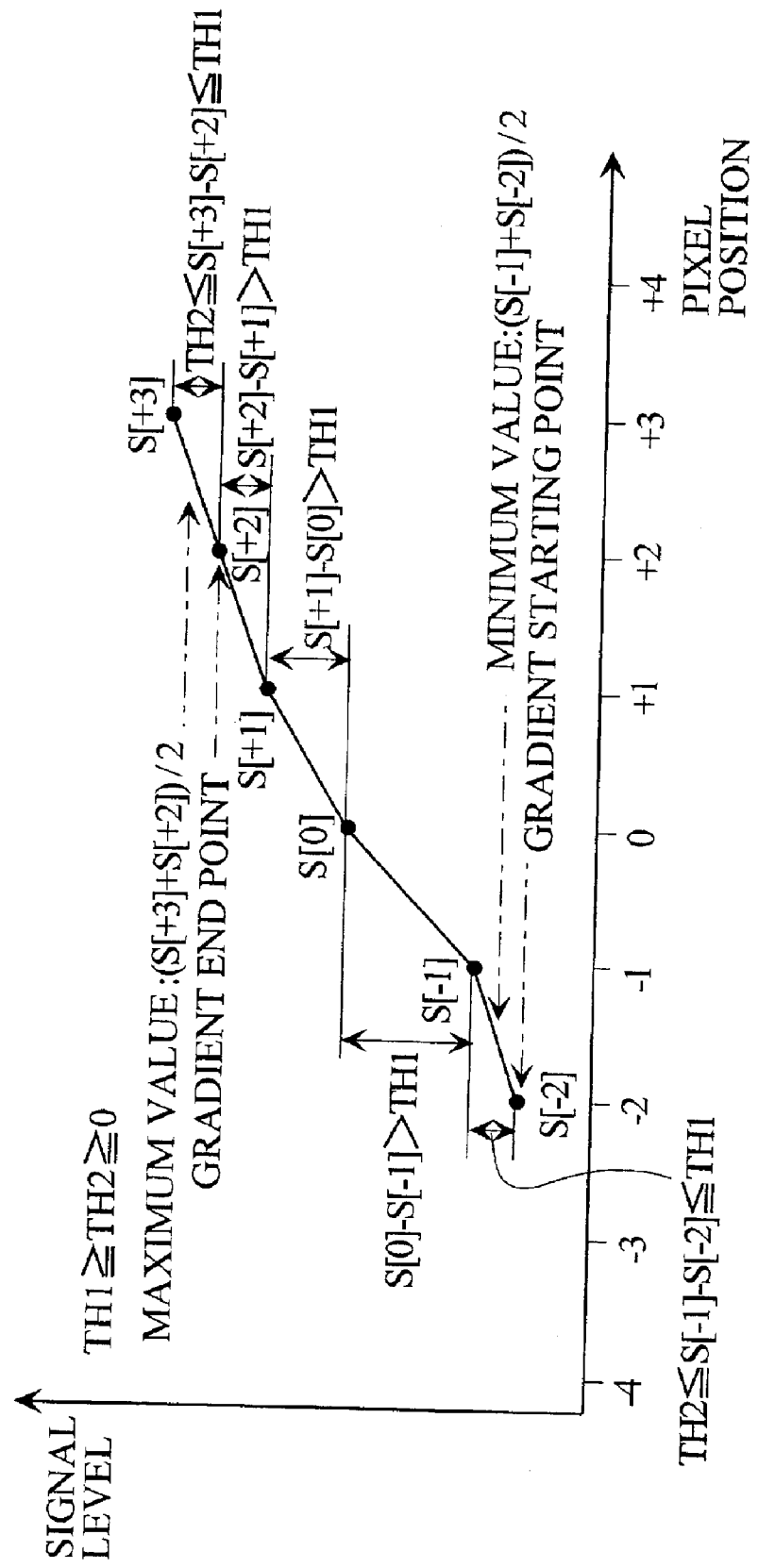
FIG. 14 is an explanatory view for explaining another example of a method of detecting a gradient by a gradient detecting unit 22.

[7] Description of Another Example of Method of Detecting Gradient by Gradient Detecting Unit Description is now made of another example of a method of detecting a gradient by the gradient detecting unit 22 using FIG. 14.

Two threshold values TH1 and TH2 (TH2<TH1) are used as threshold values for gradient judgment.

Description is made of the case shown in FIG. 14.

(1) Since S[+1]−S[0]>TH1 and S[0]−S[−1]>TH1, it is judged that the gradient is positive.

(2) S[+2]−S[+1]>TH1

(3) TH2−S[+3]−S[+2]≦TH1

The maximum value (the maximum value of the gradient portion) is determined to be (S[+3]+S[+2])/2. The temporary number of taps A is determined to be five.

(4) S[0]−S[−1]>TH1

(5) TH2≦S[−1]−S[−2]≦TH1

The minimum value (the minimum value of the gradient portion) is determined to be (S[−1]+S[−2])/2. The temporary number of taps B is determined to be five.

(6) The smaller one of the temporary numbers of taps A and B, i.e., five is selected as the number of taps. Since the number of taps is five, a starting point of the continuous five pixels, centered at the pixel to be corrected, is determined as a gradient starting point, and an end point thereof is determined as a gradient end point. Consequently, the gradient starting point signal is S[−2], and the gradient end point signal is S[+2].

[B] Description of Second Embodiment

[1] Description of Overall Configuration of Contour Correcting Circuit

Figure 15:
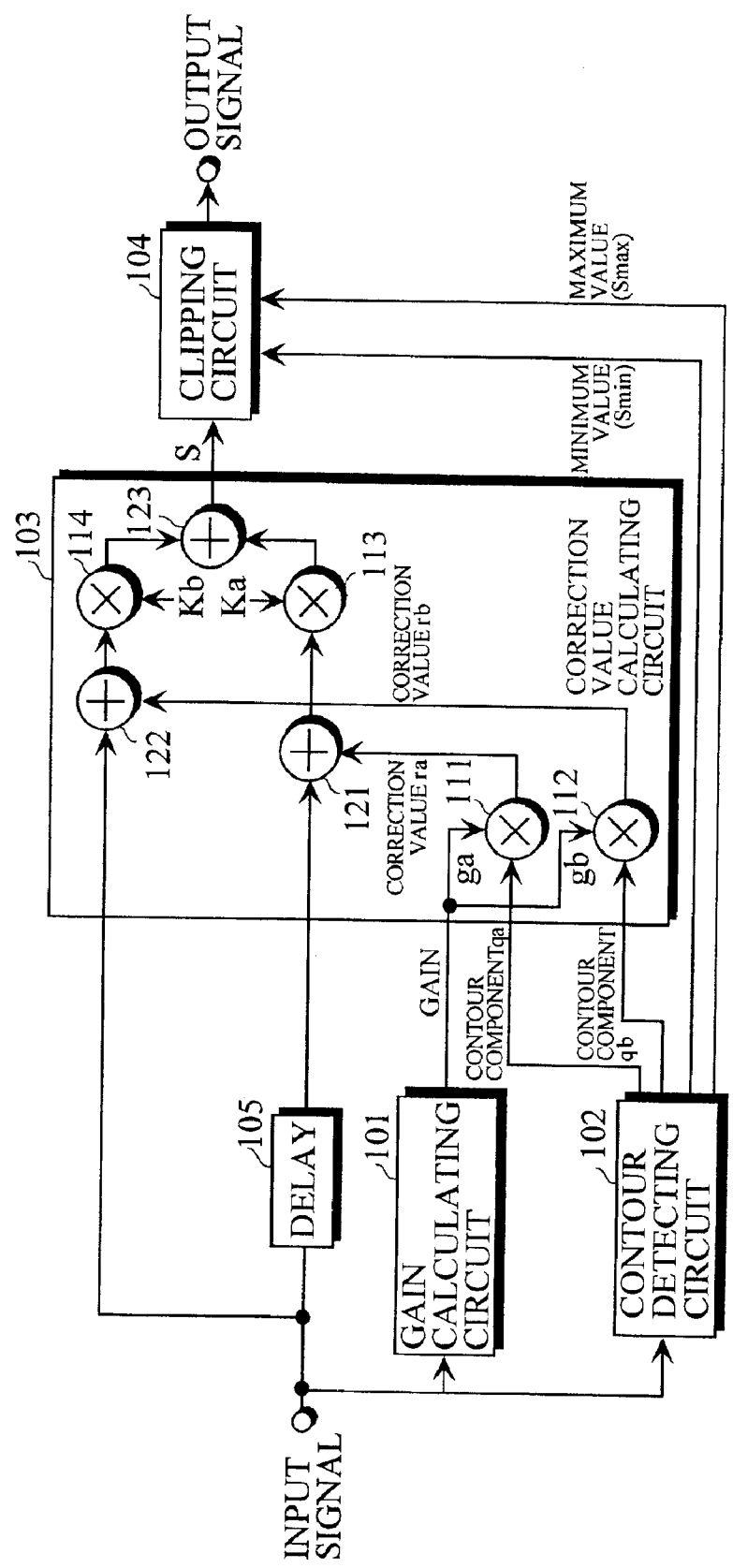
FIG. 15 is a block diagram showing the overall configuration of a contour correcting circuit according to a second embodiment of the present invention.

FIG. 15 illustrates the overall configuration of a contour correcting circuit. Also in FIG. 15, delay means for matching the respective timings of signals inputted to a correction value calculating circuit 103 and delay means for matching the respective timings of signals inputted to a clipping circuit 104 are omitted, as in the first embodiment.

Although the contour correcting circuit can be used as a horizontal contour correcting circuit or a vertical contour correcting circuit, description is made, taking as an example a case where the contour correcting circuit is used as a horizontal contour correcting circuit in the following description.

The second embodiment differs from the first embodiment in that from a signal S[0] for a pixel to be corrected and a signal S[+1] for the subsequent pixel, signals corresponding to two positions Sa and Sb between the pixels are generated and are outputted. Letting W be the distance between the pixel to be corrected and the subsequent pixel, Sa exists at a position spaced a distance corresponding to W·(¼) apart from the pixel to be corrected toward the subsequent pixel. Sa is referred to as a ¼ offset correction pixel position. Sb exists at a position spaced a distance corresponding to W·(¾) apart from the pixel to be corrected toward the subsequent pixel. Sb is referred to as a ¾ offset correction pixel position.

The contour correcting circuit comprises a delay circuit 105, a gain calculating circuit 101, a contour detecting circuit 102, a correction value calculating circuit 103, and a clipping circuit 104.

The gain calculating circuit 101 generates a gain for correction ga corresponding to the pixel to be corrected and a gain for correction gb corresponding to the subsequent pixel by the same method as that in the gain calculating circuit 1 in the first embodiment (see FIGS. 1 and 2).

The clipping circuit 104 is the same as the clipping circuit 1 in the first embodiment (see FIGS. 1 and 7), while correcting, when a signal obtained by the correction value calculating circuit 103 is not more than a minimum value for clipping, the signal to the minimum value for clipping, while correcting, when the signal obtained by the correction value calculating circuit 103 is not less than a maximum value for clipping, the signal to the maximum value for clipping.

The delay circuit 105 delays an input signal by one pixel, and outputs the delayed signal. The contour detecting circuit 102 calculates a contour component qa for the pixel to be corrected, a contour component qb for the subsequent pixel, a maximum value for clipping, and a minimum value for clipping.

The correction value calculating circuit 103 generates a contour correction signal for ¼ offset and a contour correction signal for ¾ offset.

[2] Description of Contour Detecting Circuit 102

Figure 16:
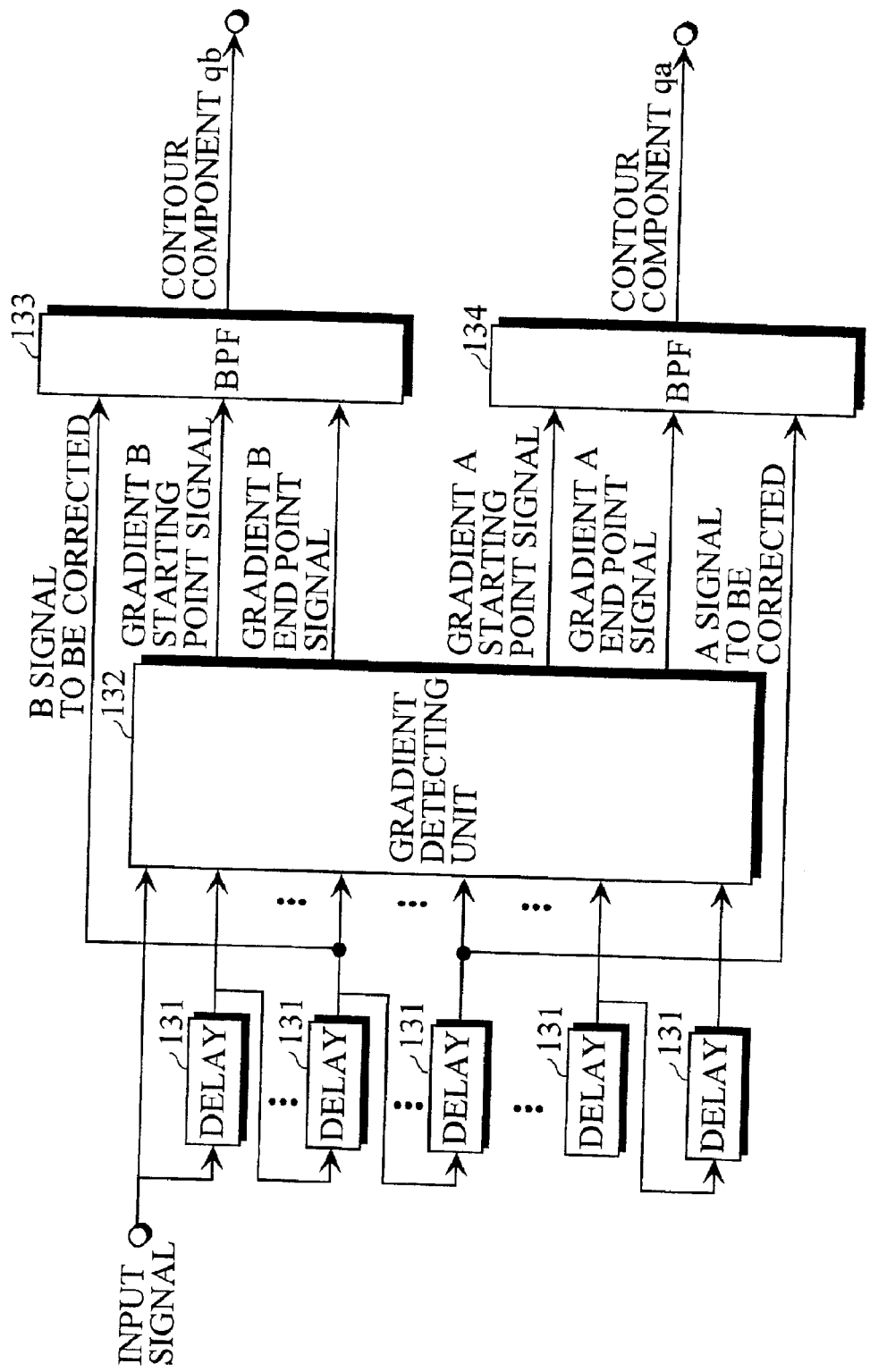
FIG. 16 is a block diagram showing the configuration of a contour detecting circuit 102.

FIG. 16 illustrates the configuration of the contour detecting circuit 102.

The contour detecting circuit 102 comprises a plurality of delay circuits 131, a gradient detecting unit 132, a first BPF, and a second BPF. Each of the delay circuits 131 delays an input signal by one pixel, and outputs the delayed signal.

The input signal and an output signal of each of the delay circuits 131 are inputted to the gradient detecting unit 132. That is, a video signal for the pixel to be corrected and respective video signals for a plurality of pixels ahead of and behind the pixel to be corrected are inputted to the gradient detecting unit 132. The gradient detecting unit 132 outputs a maximum value for clipping, a minimum value for clipping, a signal for calculating a contour component for the pixel to be corrected, and a signal for calculating a contour component for the subsequent pixel depending on the gradient of the signal inputted thereto.

The signal for calculating the contour component for the pixel to be corrected is composed of a gradient starting point signal (hereinafter referred to as a gradient A starting point signal) and a gradient end point signal (hereinafter referred to as a gradient A end point signal) for the pixel to be corrected. The signal for calculating the contour component for the subsequent pixel is composed of a gradient starting point signal (hereinafter referred to as a gradient B starting point signal) and a gradient end point signal (hereinafter referred to as a gradient B end point signal) for the subsequent pixel.

The gradient A starting point signal and the gradient A end point signal for the pixel to be corrected are sent to the second BPF 134. The gradient B starting point signal and the gradient B end point signal for the subsequent pixel are sent to the first BPF 133.

The second BPF 134 produces the contour component qa for the pixel to be corrected from a signal for the pixel to be corrected (hereinafter referred to as an A signal to be corrected) and the gradient A starting point signal and the gradient A end point signal. The contour component qa for the pixel to be corrected is calculated on the basis of the following equation (2), for example:

$$qa = 2 \times A \text{ signal to be corrected} - (\text{gradient } A \text{ starting point signal} + \text{gradient } A \text{ end point signal}) \quad (2)$$

The first BPF 133 produces the contour component qb for the subsequent pixel from a signal for a pixel subsequent to the pixel to be corrected (hereinafter referred to as a B signal to be corrected) and the gradient B starting point signal and the gradient B end point signal. The contour component qb for the subsequent pixel is calculated on the basis of the following equation (3), for example:

$$qb = 2 \times B \text{ signal to be corrected} - (\text{gradient } B \text{ starting point signal} + \text{gradient } B \text{ end point signal}) \quad (3)$$

Figure 17:
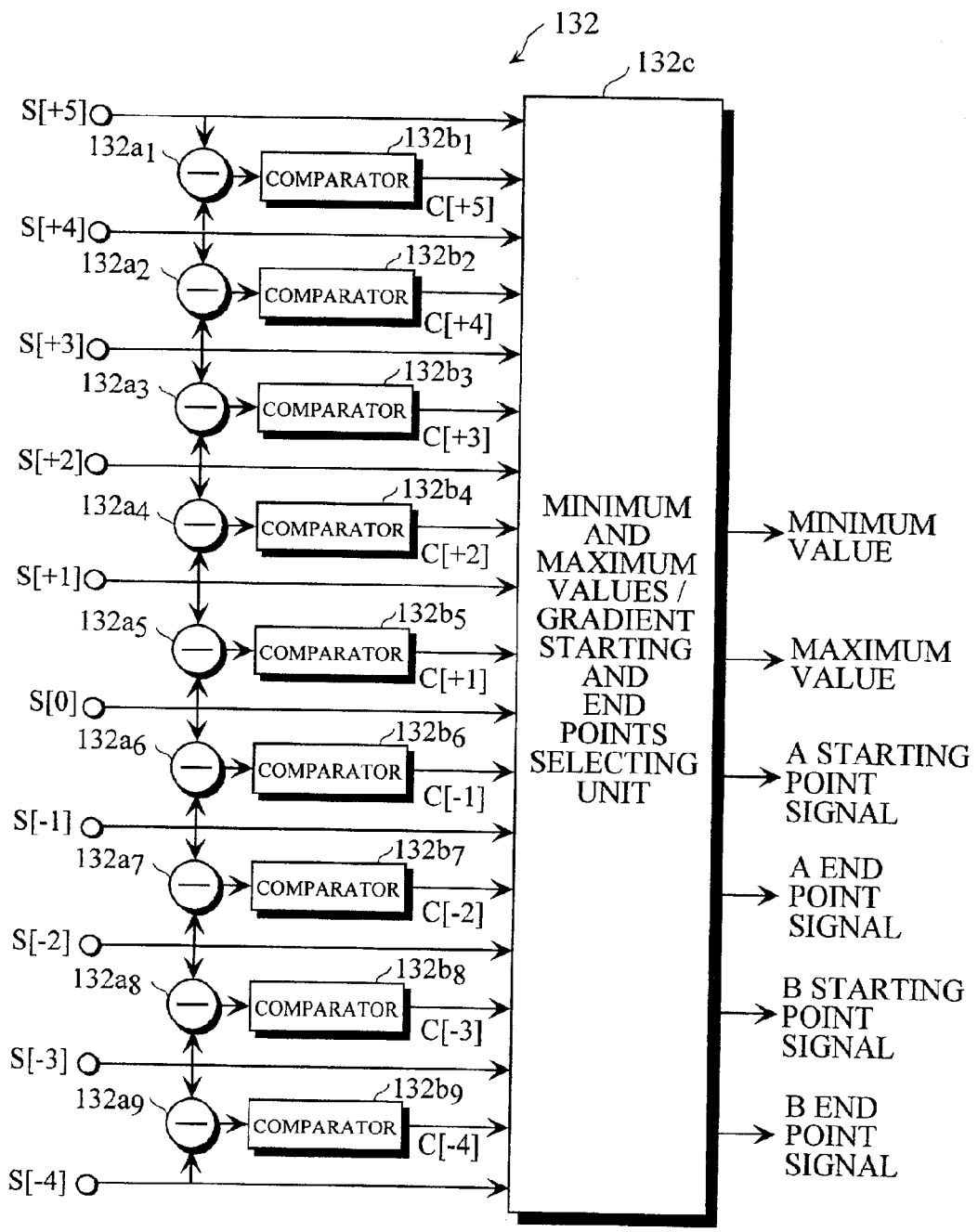
FIG. 17 is a block diagram showing the detailed configuration of a gradient detecting unit 132.

FIG. 17 illustrates the detailed configuration of the gradient detecting unit 132.

In this example, respective signals for continuous ten pixels shall be inputted to the gradient detecting unit 132. The signal for the pixel to be corrected (the A signal to be corrected) is represented by S[0], and the respective signals for the plurality of pixels ahead of and behind the pixel to be corrected are represented by S[−4] to S[−1] and S[+1] to S[+5]. The signal for the pixel subsequent to the pixel to be corrected (the B signal to be corrected) is S[+1].

The gradient detecting unit 132 comprises nine subtracters $132a_1$ to $132a_9$ for respectively calculating the differences among the respective signals for the adjacent pixels, nine comparators $132b_1$ to $132b_9$ provided for the respective subtracters $132a_1$ to $132a_9$ for comparing the results of the subtraction by the corresponding subtracters with two threshold values +TH and −TH, to detect the direction of the gradient, and a minimum and maximum values/gradient starting and end points selecting unit 132c for producing a maximum value for clipping, a minimum value for clipping, a gradient A starting point signal, a gradient B starting point signal, a gradient A end point signal, and a gradient B end point signal on the basis of the results of the comparison by each of the comparators $132b_1$ to $132b_9$.

The subtracters $132a_1$ to $132a_9$ perform the following subtraction:

Subtracter $132a_1$: S[+5]−S[+4]
Subtracter $132a_2$: S[+4]−S[+3]
Subtracter $132a_3$: S[+3]−S[+2]
Subtracter $132a_4$: S[+2]−S[+1]
Subtracter $132a_5$: S[+1]−S[0]
Subtracter $132a_6$: S[0]−S[−1]
Subtracter $132a_7$: S[−1]−S[−2]
Subtracter $132a_8$: S[−2]−S[−3]
Subtracter $132a_9$: S[−3]−S[−4]

The respective comparators $132b_1$ to $132b_9$ make the following judgment on an input value IN, and respectively output the results of the judgment C[+5] to C[−4].

If IN>+TH then direction of gradient=positive (gradient+: upward to the right)

If IN<−TH then direction of gradient=negative (gradient−: downward to the right)

If −TH≦IN≦+TH then direction of gradient=0 (no gradient)

Figure 18:
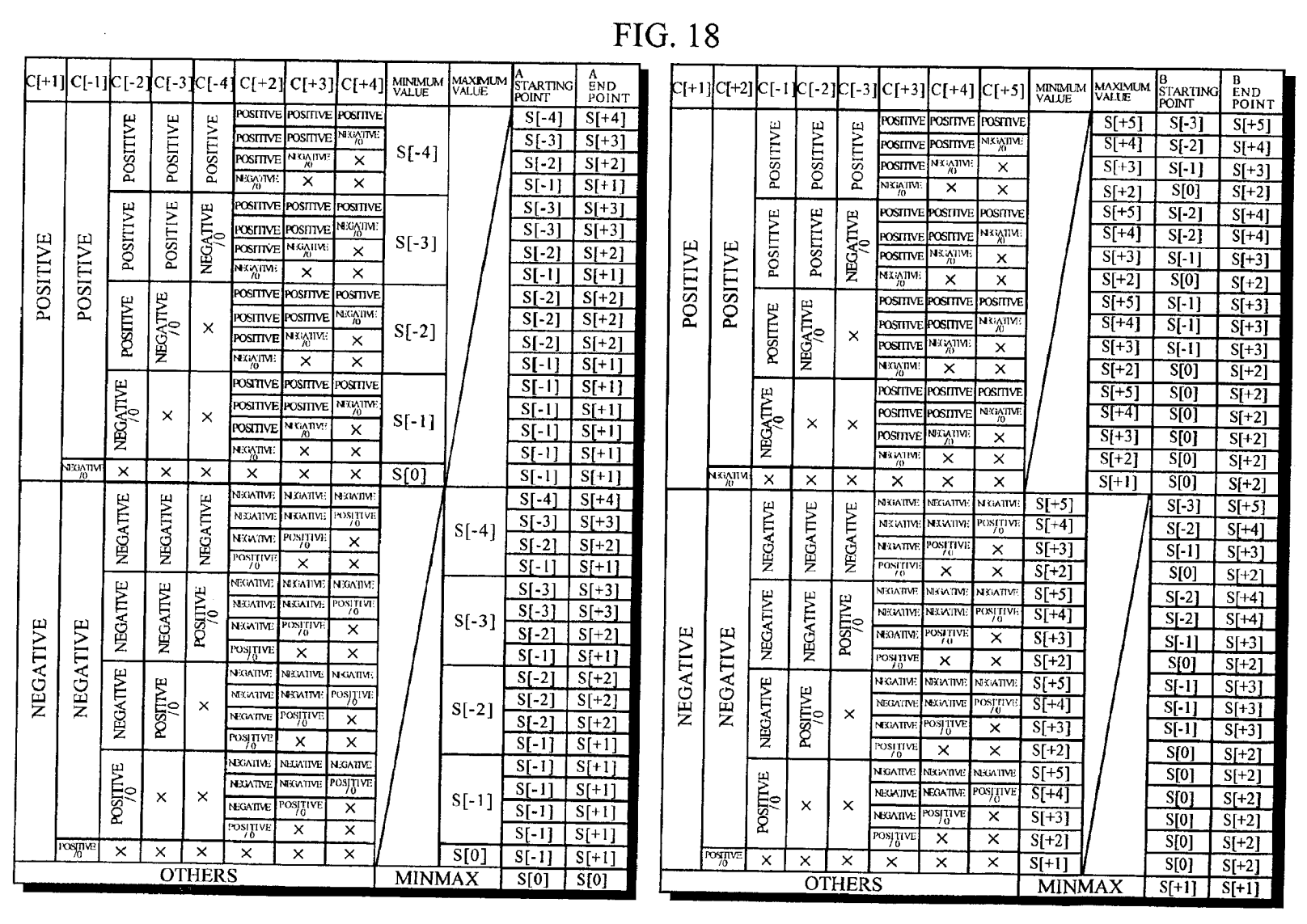

The minimum and maximum values/gradient starting and end points selecting unit 132c produces a maximum value for clipping, a minimum value for clipping, a gradient A starting point signal, a gradient B starting point signal, a gradient A end point signal, and a gradient B end point signal by a table as shown in FIG. 18 or a logical circuit having the table as shown in FIG. 18 as a truth table.

Specifically, the minimum and maximum values/gradient starting and end points selecting unit 132c produces a maximum value for clipping, a minimum value for clipping, a gradient A starting point signal, a gradient B starting point signal, a gradient A end point signal, and a gradient B end point signal on the basis of the output values C[−4] to C[+5] of the respective comparators $132b_1$ to $132b_9$.

However, a maximum value for clipping Smax and a minimum value for clipping Smin at the time of ¼ offset calculation or ¾ offset calculation in a case where there is no gradient are found on the basis of the following equation (4):

At time of ¼ offset calculation: Smin=Smax=(S[0]×3+S[+1])/4

At time of ¾ offset calculation: Smin=Smax=(S[0]+S[+1]×3)/4  (4)

Figure 19:
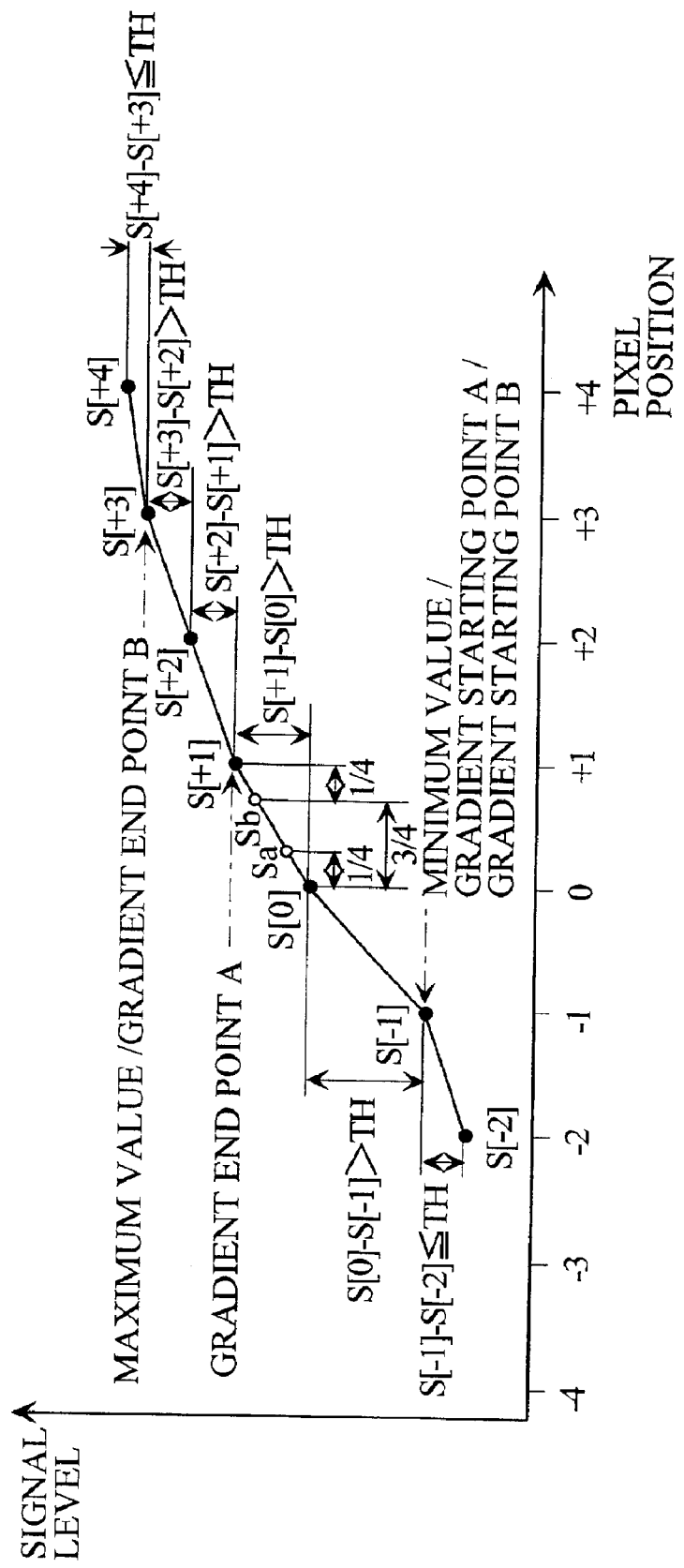
FIG. 19 is an explanatory view for explaining the basic idea of a method of detecting a gradient by a gradient detecting unit 132.

Description is made of the basic idea of a method of detecting a gradient by the gradient detecting unit 132 using FIG. 19.

Description is herein made, taking a positive gradient as an example.

Since S[+1]−S[0]>TH, it is judged that the gradient is positive.

(A) Calculation of gradient A starting point signal and gradient A end point signal for pixel to be corrected and minimum value (1) S[+2]−S[+1]>TH
(2) S[+3]−S[+2]>TH
(3) S[+4]−S[+3]≦TH The temporary number of taps A is determined to be seven.

(4) S[0]−S[−1]>TH
(5) S[−1]−S[−2]≦TH

Consequently, the minimum value is determined to be S[−1]. The temporary number of taps B is determined to be three.

(6) The smaller one of the temporary numbers of taps A and B, i.e., three is selected as the number of taps. Since the number of taps is three, a starting point of the continuous three pixels, centered at the pixel to be corrected, is determined as a gradient starting point, and an end point thereof is determined as a gradient end point. Consequently, the gradient A starting point signal is S [−1], and the gradient A end point signal is S[+1].

(B) Calculation of gradient B starting point signal and gradient B end point signal for the subsequent pixel and maximum value (1) S[+2]−S[+1]>TH
(2) S[+3]−S[+2]>TH
(3) S[+4]−S[+3]≦TH The maximum value is determined to be S[+3]. Since the position of the subsequent pixel (S[+1]) is used as a basis, the temporary number of taps A is determined to be five.

(4) S[0]−S[−1]>TH
(5) S[−1]−S[−2]≦TH

Since the position of the subsequent pixel (S[+1]) is used as a basis, the temporary number of taps B is determined to be five.

(6) The smaller one of the temporary numbers of taps A and B, i.e., five is selected as the number of taps. A starting point of the continuous five pixels, centered at the subsequent pixel, is determined as a gradient starting point, and an end point thereof is determined as a gradient end point. Consequently, the gradient B starting point signal is S[−1], and the gradient B end point signal is S[+3].

[3] Description of Correction Value Calculating Circuit 103

The correction value calculating circuit 103 comprises first to fourth multiplier 111, 112, 113, and 114, and first to third adders 121, 122, and 123, as shown in FIG. 15.

The first multiplier 111 multiplies the contour component qa for the pixel to be corrected by a gain ga corresponding to the pixel to be corrected obtained by the gain calculating circuit 101, to produce a first correction value ra. The first adder 121 adds the first correction value ra to the pixel to be corrected, to generate a signal for the pixel to be corrected whose contour has been corrected. A third multiplier 113 multiples the signal for the pixel to be corrected whose contour has been corrected by a coefficient Ka.

The second multiplier 112 multiplies the contour component qb for the subsequent pixel by a gain gb corresponding to the subsequent pixel obtained by the gain calculating circuit 101, to produce a second correction value rb. The second adder 122 adds the second correction value rb to the subsequent pixel, to generate a signal for the subsequent pixel whose contour has been corrected. A fourth multiplier 114 multiples the signal for the subsequent pixel whose contour has been corrected by a coefficient Kb. The third adder 123 adds an output of the third multiplier 113 and an output of the fourth multiplier 114 together. An output of the third adder 123 is sent to the clipping circuit 104.

The coefficients Ka and Kb are set, as follows:

At ¼ offset timing: Ka=¾, Kb=¼

At ¾ offset timing: Ka=¼, Kb=¾

At the ¼ offset timing, a contour correction signal for ¼ offset is obtained from the third adder 123. At the ¾ offset timing, a contour correction signal for ¾ offset is obtained from the third adder 123. The correction signals are outputted through the clipping circuit 104.

[4] Description of Advantages of Second Embodiment

In the second embodiment, letting W be the distance between the pixel to be corrected and the subsequent pixel, contour correction signals are respectively generated at a position spaced a distance corresponding to W·(¼) apart from the pixel to be corrected toward the subsequent pixel (a ¼ offset correction pixel position) and a position spaced a distance corresponding to W·(¾) apart from the pixel to be corrected toward the subsequent pixel (a ¾ offset correction pixel position). A case where a contour correction signal is generated at an offset position and a case where no contour correction signal is generated at an offset position will be compared with each other.

Figure 20A:
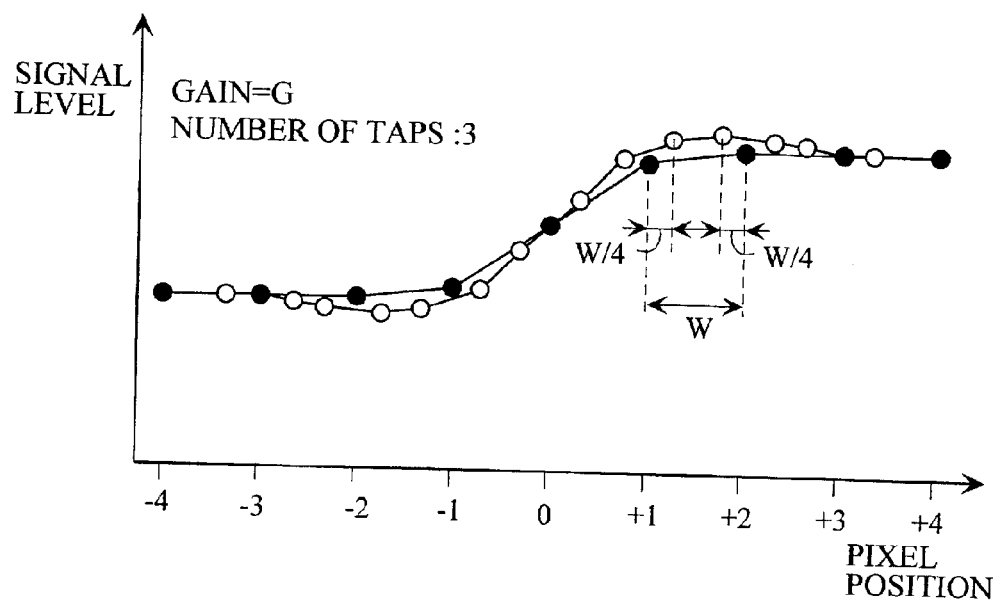
FIGS. 20a and 20b are timing charts showing an original signal (a black circle) and a contour correction signal (a white circle) in a case where a correction pixel is provided.
Figure 20B:
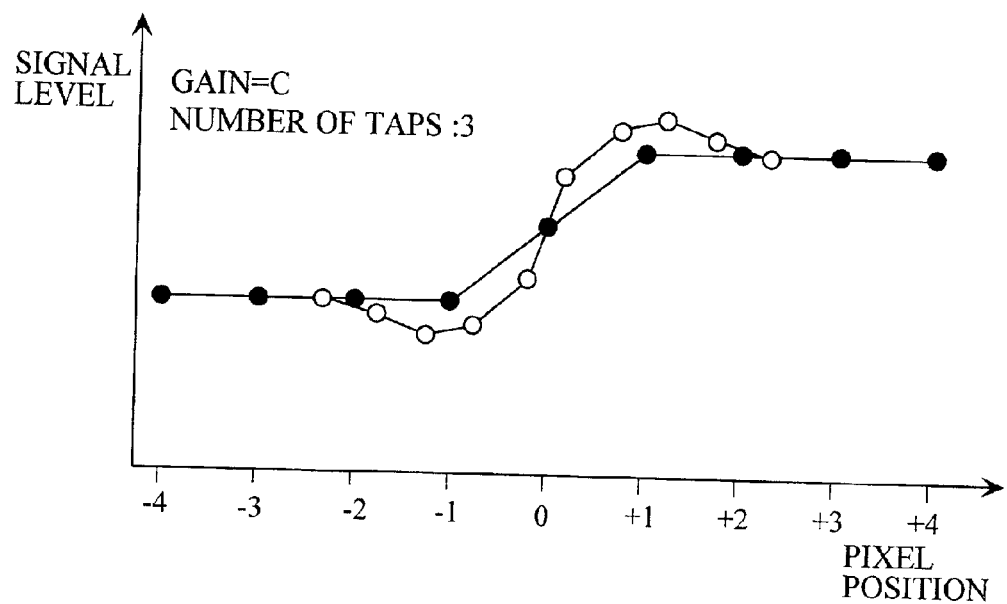
Figure 21A:
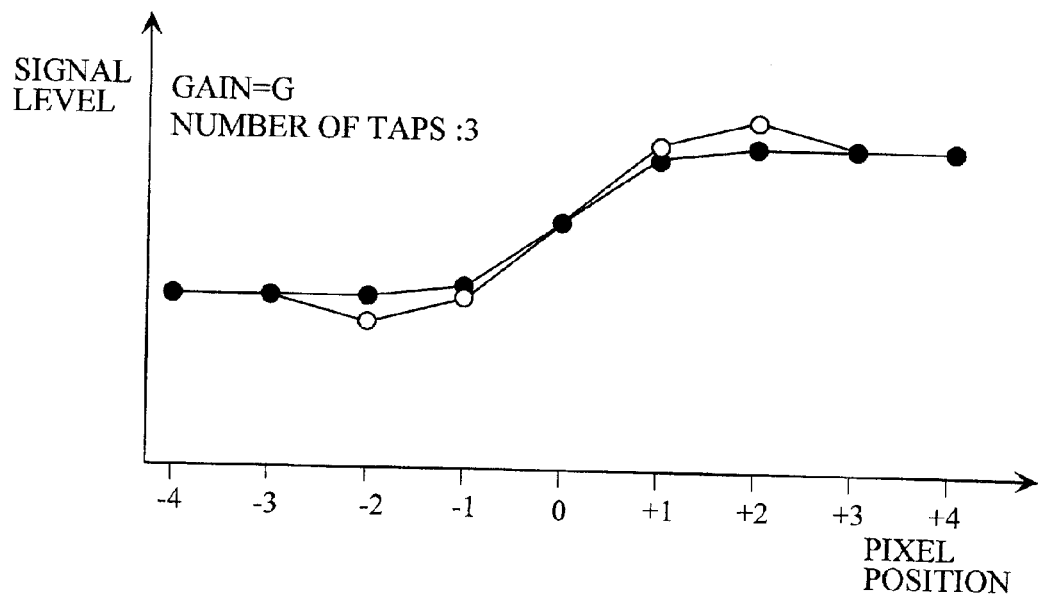
FIGS. 21a and 21b are timing charts showing an original signal (a black circle) and a contour correction signal (a white circle) in a case where no correction pixel is provided.
Figure 21B:
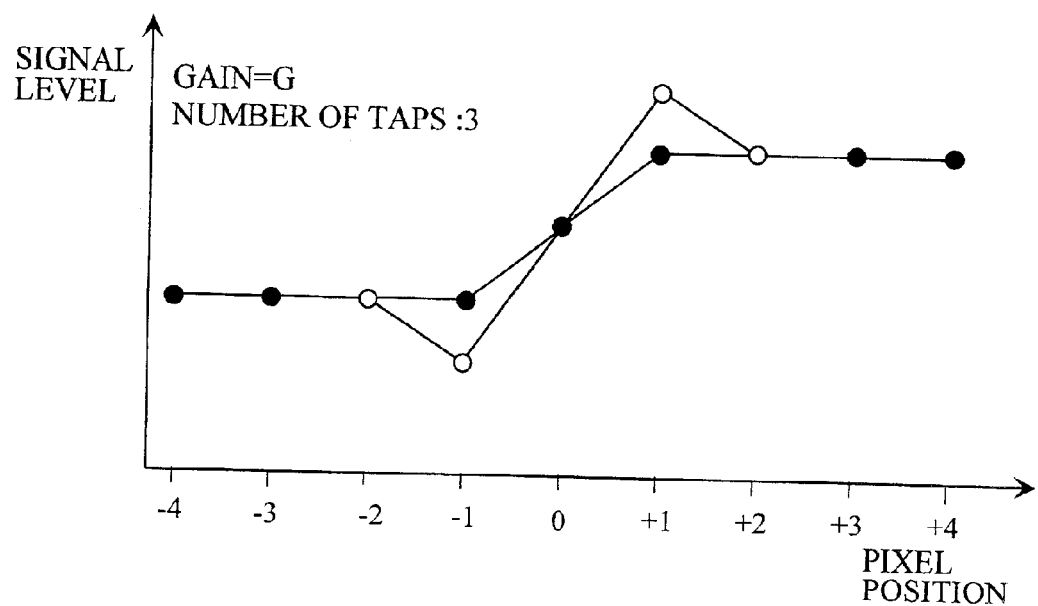

FIGS. 20*a* and 20*b* illustrate an original signal (a black circuit) and a contour correction signal (a white circle) in a case where a contour correction signal is generated at an offset position, and FIGS. 21*a* and 21*b* illustrate an original signal (a black circuit) and a contour correction signal (a white circle) in a case where no contour correction signal is generated at the offset position FIGS. 20*a* and 21*a* illustrate a case where the gradient of the signal is small, and FIGS. 20*b* and 21*b* illustrate a case where the gradient of the signal is large.

In a case where a contour correction signal is generated at the offset position (FIGS. 20*a* and 20*b*), a jagged feeling which is enhanced in the case of an oblique line or the like is relieved, as compared with a case where no contour correction signal is generated at the offset position (FIGS. 21*a* and 21*b*).

Figure 22:
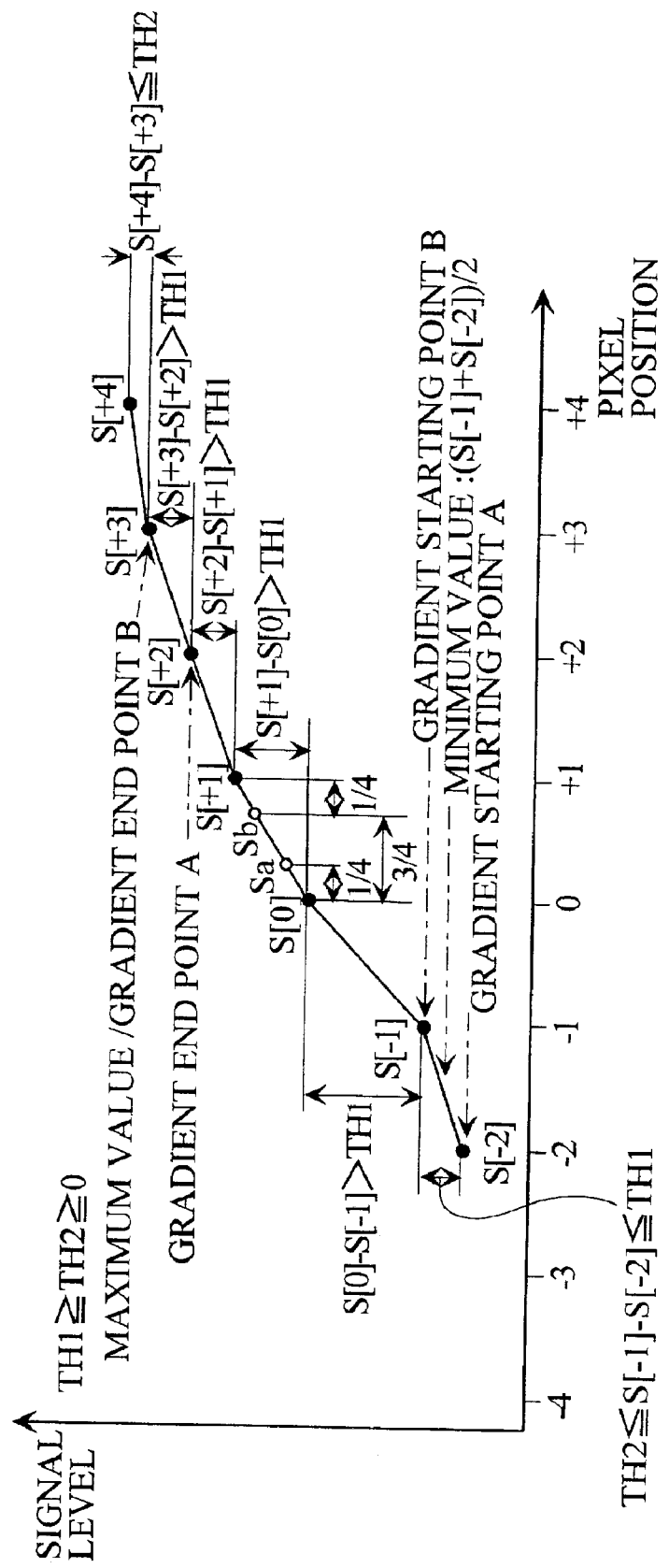
FIG. 22 is an explanatory view for explaining another example of a method of detecting a contour by a contour detecting unit.

[5] Description of Another Example of Method of Detecting Gradient by Gradient Detecting Unit Description is made of another example of a method of detecting a gradient by the gradient detecting unit 132 using FIG. 22.

Two threshold values TH1 and TH2 (TH2<TH1) are used as threshold values for gradient judgment.

Description is herein made, taking a positive gradient as an example.

Since S[+1]−S[0]>TH1, it is judged that the gradient is positive.

(A) Calculation of gradient A starting point signal and gradient A end point signal for pixel to be corrected and minimum value (1) S[+2]−S[+1]>TH1
(2) S[+3]−S[+2]>TH1
(3) S[+4]−S[+3]≦TH2

The temporary number of taps A is determined to be seven.

(4) S[0]−S[−1]>TH1
(5) TH2≦S[−1]−S[−2]≦TH1

The minimum value is determined to be (S[−1]+S[−2])/2. The temporary number of taps B is determined to be five.

(6) The smaller one of the temporary numbers of taps A and B, i.e., five is selected as the number of taps. A starting point of the continuous five pixels, centered at the pixel to be corrected, is determined as a gradient starting point, and an end point thereof is determined as a gradient end point. Consequently, the gradient A starting point signal is S[−2], and the gradient A end point signal is S[+2].

(B) Calculation of gradient B starting point signal and gradient B end point signal for the subsequent pixel and maximum value (1) S[+2]−S[+1]>TH1
(2) S[+3]−S[+2]>TH1
(3) S[+4]−S[+3]≦TH2

The maximum value is determined to be S[+3]. Since the position of the subsequent pixel (S[+1]) is used as a basis, the temporary number of taps A is determined to be five.

(4) S[0]−S[−1]>TH1
(5) TH2≦S[−1]−S[−2]≦TH1

Since the position of the subsequent pixel (S[+1]) is used as a basis, the temporary number of taps B is determined to be seven.

(6) The smaller one of the temporary numbers of taps A and B, i.e., five is selected as the number of taps. A starting point of the continuous five pixels, centered at the subsequent pixel, is determined as a gradient starting point, and an end point thereof is determined as a gradient end point. Consequently, the gradient B starting point signal is S[−1], and the gradient B end point signal is S[+3].

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. In a contour correcting circuit that generates, on the basis of respective signals for a plurality of pixels including the pixel to be corrected at the center and arranged in a particular direction, a contour correction signal for the pixel to be corrected, a contour correcting circuit comprising:
contour component production means for producing a contour component for the pixel to be corrected depending on the gradient of the change among the respective signals for the plurality of pixels arranged in the particular direction;
gain calculation means for calculating, on the basis of the level difference between the signal for the pixel to be corrected and the signal for the pixel adjacent in the particular direction to the pixel to be corrected, such a gain for correction that the larger the level difference is, the smaller the gain becomes;
multiplication means for multiplying the contour component produced by the contour component production means by the gain for correction calculated by the gain calculation means; and addition means for adding the results of the multiplication by the multiplication means to the signal for the pixel to be corrected, to generate the contour correction signal for the pixel to be corrected.

2. The contour correcting circuit according to claim 1, further comprising offset contour correction pixel production means for weighting and adding the contour correction signal for the pixel to be corrected and a contour correction signal for the pixel adjacent to the pixel to be corrected, to produce one or a plurality of offset contour correction pixels between the pixel to be corrected and the adjacent pixel.

3. The contour correcting circuit according to claim 2, further comprising minimum and maximum values calculation means for calculating the minimum value and the maximum value of a portion having a gradient which is not less than a predetermined gradient depending on the gradient of the change among the respective signals for the plurality of pixels arranged in the particular direction, and clipping means for comparing the contour correction signal with the minimum value and the maximum value which are calculated by the minimum and maximum values calculation means, to correct, when the contour correction signal is smaller than the minimum value, the contour correction signal to the minimum value, while correcting, when the contour correction signal is larger than the maximum value, the contour correction signal to the maximum value.

4. The contour correcting circuit according to claim 3, wherein the contour component production means comprises selection means for selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and means for producing a contour component for the pixel to be corrected on the basis of the respective signals for the gradient starting point pixel and the gradient end point pixel which are selected by the selection means and the signal for the pixel to be corrected.

5. The contour correcting circuit according to claim 2, wherein the contour component production means comprises selection means for selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and means for producing a contour component for the pixel to be corrected on the basis of the respective signals for the gradient starting point pixel and the gradient end point pixel which are selected by the selection means and the signal for the pixel to be corrected.

6. The contour correcting circuit according to claim 1, further comprising minimum and maximum values calculation means for calculating the minimum value and the maximum value of a portion having a gradient which is not less than a predetermined gradient depending on the gradient of the change among the respective signals for the plurality of pixels arranged in the particular direction, and clipping means for comparing the contour correction signal with the minimum value and the maximum value which are calculated by the minimum and maximum values calculation means, to correct, when the contour correction signal is smaller than the minimum value, the contour correction signal to the minimum value, while correcting, when the contour correction signal is larger than the maximum value, the contour correction signal to the maximum value.

7. The contour correcting circuit according to claim 6, wherein the contour component production means comprises selection means for selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and means for producing a contour component for the pixel to be corrected on the basis of the respective signals for the gradient starting point pixel and the gradient end point pixel which are selected by the selection means and the signal for the pixel to be corrected.

8. The contour correcting circuit according to claim 1, wherein the contour component production means comprises selection means for selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and means for producing a contour component for the pixel to be corrected on the basis of the respective signals for the gradient starting point pixel and the gradient end point pixel which are selected by the selection means and the signal for the pixel to be corrected.

9. In a contour correcting method for generating, on the basis of respective signals for a plurality of pixels including the pixel to be corrected at the center and arranged in a particular direction, a contour correction signal for the pixel to be corrected, a contour correcting method comprising:

a first step of producing a contour component for the pixel to be corrected depending on the gradient of the change among the respective signals for the plurality of pixels arranged in the particular direction;

a second step of calculating, on the basis of the level difference between the signal for the pixel to be corrected and the signal for the pixel adjacent in the particular direction to the pixel to be corrected, such a gain for correction that the larger the level difference is, the smaller the gain becomes;

a third step of multiplying the contour component produced at the first step by the gain for correction calculated at the second step; and a fourth step of adding the results of the multiplication at the third step to the signal for the pixel to be corrected, to generate the contour correction signal for the pixel to be corrected.

10. The contour correcting method according to claim 9, further comprising
- a fifth step of weighting and adding the contour correction signal for the pixel to be corrected and a contour correction signal for the pixel adjacent to the pixel to be corrected, to produce one or a plurality of offset contour correction pixels between the pixel to be corrected and the adjacent pixel.

11. The contour correcting method according to claim 10, further comprising
- a sixth step of calculating the minimum value and the maximum value of a portion having a gradient which is not less than a predetermined gradient depending on the gradient of the change among the respective signals for the plurality of pixels arranged in the particular direction, and
- a seventh step of comparing the contour correction signal with the minimum value and the maximum value calculated at the sixth step, to correct, when the contour correction signal is smaller than the minimum value, the contour correction signal to the minimum value, while correcting, when the contour correction signal is larger than the maximum value, the contour correction signal to the maximum value.

12. The contour correcting method according to claim 11, wherein
the first step comprises
- an eighth step of selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and
- a ninth step of producing a contour component for the pixel to be corrected on the basis of the respective signals for the gradient starting point pixel and the gradient end point pixel which are selected at the eighth step and the signal for the pixel to be corrected.

13. The contour correcting method according to claim 10, wherein
the first step comprises
- an eighth step of selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and
- a ninth step of producing a contour component for the pixel to be corrected on the basis of the respective signals for the gradient starting point pixel and the gradient end point pixel which are selected at the eighth step and the signal for the pixel to be corrected.

14. The contour correcting method according to claim 9, further comprising
- a sixth step of calculating the minimum value and the maximum value of a portion having a gradient which is not less than a predetermined gradient depending on the gradient of the change among the respective signals for the plurality of pixels arranged in the particular direction, and
- a seventh step of comparing the contour correction signal with the minimum value and the maximum value calculated at the sixth step, to correct, when the contour correction signal is smaller than the minimum value, the contour correction signal to the minimum value, while correcting, when the contour correction signal is larger than the maximum value, the contour correction signal to the maximum value.

15. The contour correcting method according to claim 14, wherein
the first step comprises
- an eighth step of selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and
- a ninth step of producing a contour component for the pixel to be corrected on the basis of the respective signals for the gradient starting point pixel and the gradient end point pixel which are selected at the eighth step and the signal for the pixel to be corrected.

16. The contour correcting method according to claim 9, wherein
the first step comprises
- an eighth step of selecting, out of the plurality of pixels arranged in the particular direction, the gradient starting point pixel and the gradient end point pixel which are spaced an equal distance apart from the pixel to be corrected on the basis of the gradient of the change among the respective signals for the plurality of pixels arranged in the particular direction, and
- a ninth step of producing a contour component for the pixel to be corrected on the basis of the respective signals for the gradient starting point pixel and the gradient end point pixel which are selected at the eighth step and the signal for the pixel to be corrected.

* * * * *